United States Patent
Hebrink et al.

(10) Patent No.: US 11,906,252 B2
(45) Date of Patent: *Feb. 20, 2024

(54) COMPOSITE COOLING FILM AND ARTICLE INCLUDING THE SAME

(71) Applicant: 3M INNOVATIVE PROPERTIES COMPANY, St. Paul, MN (US)

(72) Inventors: Timothy J. Hebrink, Scandia, MN (US); Michelle M. Mok, St. Paul, MN (US); Derek J. Dehn, Maplewood, MN (US); Mary E. Johansen, Woodbury, MN (US); Lon R. Johnson, New Brighton, MN (US); Todd G. Pett, St. Paul, MN (US); Moses M. David, Woodbury, MN (US); James P. Burke, St. Paul, MN (US); Vivian W. Jones, Woodbury, MN (US); Haiyan Zhang, Lake Elmo, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/609,716

(22) PCT Filed: May 27, 2020

(86) PCT No.: PCT/IB2020/055045
§ 371 (c)(1),
(2) Date: Nov. 8, 2021

(87) PCT Pub. No.: WO2020/240447
PCT Pub. Date: Dec. 3, 2020

(65) Prior Publication Data
US 2022/0221235 A1    Jul. 14, 2022

Related U.S. Application Data

(60) Provisional application No. 62/855,407, filed on May 31, 2019.

(51) Int. Cl.
*F28F 13/18* (2006.01)
*B32B 3/30* (2006.01)
(Continued)

(52) U.S. Cl.
CPC ............. *F28F 13/185* (2013.01); *B32B 3/30* (2013.01); *B32B 5/18* (2013.01); *B32B 7/12* (2013.01);
(Continued)

(58) Field of Classification Search
CPC ............ B32B 2250/03; B32B 2255/10; B32B 2255/205; B32B 2264/0278;
(Continued)

(56) References Cited

U.S. PATENT DOCUMENTS

| 4,726,989 A | 2/1988 | Mrozinksi |
| 4,874,567 A | 10/1989 | Lopatin |

(Continued)

FOREIGN PATENT DOCUMENTS

| CN | 1367804 A | 8/2004 |
| CN | 102625889 A | 8/2012 |

(Continued)

OTHER PUBLICATIONS

Addeo, "Light selective structures for large scale natural air conditioning", Solar Energy, 1980, vol. 24, pp. 93-98.

(Continued)

*Primary Examiner* — Hai Vo
(74) *Attorney, Agent, or Firm* — Thomas M. Spielbauer; Julie Lapos-Kuchar

(57) ABSTRACT

A composite cooling film (100) comprises an antisoiling layer (160) secured to a first major surface of a reflective microporous layer (110). The reflective microporous layer (110) comprises a first fluoropolymer and is diffusely reflective of electromagnetic radiation over a majority of wave- (Continued)

lengths in the range of 400 to 2500 nanometers. The antisoiling layer (160) has an outwardly facing antisoiling surface (162) opposite the micro-voided polymer film. An article (1100) comprising the composite cooling film (1112) secured to a substrate (1110) is also disclosed.

29 Claims, 10 Drawing Sheets

(51) Int. Cl.
  *B32B 5/18* (2006.01)
  *B32B 7/12* (2006.01)
  *B32B 27/08* (2006.01)
  *B32B 27/30* (2006.01)
  *F28F 19/04* (2006.01)

(52) U.S. Cl.
  CPC ............ *B32B 27/08* (2013.01); *B32B 27/304* (2013.01); *F28F 19/04* (2013.01); *B32B 2250/03* (2013.01); *B32B 2255/10* (2013.01); *B32B 2255/205* (2013.01); *B32B 2264/0278* (2013.01); *B32B 2266/0235* (2013.01); *B32B 2266/104* (2016.11); *B32B 2307/416* (2013.01); *B32B 2307/712* (2013.01); *B32B 2307/732* (2013.01)

(58) Field of Classification Search
  CPC ...... B32B 2266/0235; B32B 2266/104; B32B 2307/416; B32B 2307/712; B32B 2307/732; B32B 27/08; B32B 27/304; B32B 3/30; B32B 5/18; B32B 7/12; F24S 21/00; F25B 2400/12; F28F 13/185; F28F 19/04; Y02B 10/20
  See application file for complete search history.

(56) References Cited

U.S. PATENT DOCUMENTS

| | | | |
|---|---|---|---|
| 4,968,464 A * | 11/1990 | Kojoh | C08J 5/18 264/289.3 |
| 4,976,859 A | 12/1990 | Wechs | |
| 5,126,394 A | 6/1992 | Revis | |
| 5,238,623 A | 8/1993 | Mrozinski | |
| 5,882,774 A | 3/1999 | Jonza | |
| 5,993,954 A | 11/1999 | Radovanovic | |
| 6,045,894 A | 4/2000 | Jonza | |
| 6,261,994 B1 | 7/2001 | Bourdelais | |
| 6,277,485 B1 | 8/2001 | Invie | |
| 6,352,761 B1 | 3/2002 | Hebrink | |
| 6,368,699 B1 | 4/2002 | Gilbert | |
| 6,368,742 B2 | 4/2002 | Fisher | |
| 6,376,590 B2 | 4/2002 | Kolb | |
| 6,449,093 B2 | 9/2002 | Hebrink | |
| 6,531,230 B1 | 3/2003 | Weber | |
| 6,632,850 B2 | 10/2003 | Hughes | |
| 6,667,095 B2 | 12/2003 | Wheatley | |
| 6,744,561 B2 | 6/2004 | Condo | |
| 6,783,349 B2 | 8/2004 | Neavin | |
| 7,153,588 B2 | 12/2006 | McMan | |
| 7,271,951 B2 | 9/2007 | Weber | |
| 7,328,638 B2 | 2/2008 | Gardiner | |
| 7,345,137 B2 | 3/2008 | Hebrink | |
| 7,350,442 B2 | 4/2008 | Ehnes | |
| 7,632,568 B2 | 12/2009 | Padiyath | |
| 7,652,736 B2 | 1/2010 | Padiyath | |
| 7,952,805 B2 | 5/2011 | McGurran | |
| 8,234,998 B2 | 8/2012 | Krogman | |
| 8,313,798 B2 | 11/2012 | Nogueira | |
| 8,517,570 B2 | 8/2013 | Teather | |
| 8,962,214 B2 | 2/2015 | Smith | |
| 9,383,482 B2 | 7/2016 | Walker, Jr. et al. | |
| 9,523,516 B2 | 12/2016 | Hebrink | |
| 9,670,300 B2 | 6/2017 | Olson | |
| 9,709,349 B2 | 7/2017 | Raman | |
| 9,902,869 B2 | 2/2018 | Schmidt | |
| 9,923,111 B2 | 3/2018 | Fan | |
| 10,088,251 B2 | 10/2018 | Raman | |
| 10,240,013 B2 | 3/2019 | Mrozinski | |
| 2003/0104192 A1 * | 6/2003 | Hester | C02F 3/108 428/304.4 |
| 2004/0005451 A1 | 1/2004 | Kretman et al. | |
| 2005/0233070 A1 | 10/2005 | Pellerite | |
| 2006/0004780 A1 | 1/2006 | Maeda | |
| 2006/0148950 A1 | 7/2006 | Davidson | |
| 2009/0147361 A1 | 6/2009 | Gardiner | |
| 2009/0283144 A1 | 11/2009 | Hebrink | |
| 2010/0290109 A1 | 11/2010 | Kurt | |
| 2011/0064936 A1 | 3/2011 | Hammond-Cunningham | |
| 2011/0123788 A1 | 5/2011 | Viasnoff | |
| 2012/0011850 A1 | 1/2012 | Hebrink | |
| 2012/0148829 A1 | 6/2012 | Krogman | |
| 2013/0236697 A1 | 9/2013 | Walker, Jr. | |
| 2014/0131023 A1 | 5/2014 | Raman | |
| 2015/0131146 A1 | 5/2015 | Fan | |
| 2015/0175479 A1 | 6/2015 | Brown | |
| 2015/0338175 A1 | 11/2015 | Raman | |
| 2016/0008772 A1 * | 1/2016 | Kosar | B01D 69/06 521/88 |
| 2016/0268464 A1 | 9/2016 | Fan | |
| 2016/0298266 A1 | 10/2016 | Zillig | |
| 2017/0045284 A1 * | 2/2017 | Meuler | B32B 7/06 |
| 2017/0198129 A1 | 7/2017 | Olson | |
| 2017/0248381 A1 | 8/2017 | Yang | |
| 2018/0180331 A1 | 6/2018 | Yu | |
| 2018/0244928 A1 | 8/2018 | Van Overmeere et al. | |
| 2019/0086164 A1 | 3/2019 | Yang et al. | |
| 2019/0184687 A1 | 6/2019 | Yasuda | |
| 2022/0221627 A1 * | 7/2022 | Hebrink | G02B 5/0891 |
| 2022/0355567 A1 * | 11/2022 | Hebrink | B32B 27/304 |

FOREIGN PATENT DOCUMENTS

| | | | |
|---|---|---|---|
| CN | 102884453 A | | 1/2013 |
| JP | 2004092931 | | 3/2004 |
| JP | 2005028926 A | | 2/2005 |
| JP | 2006231869 A | | 9/2006 |
| JP | 2009255487 A | | 11/2009 |
| WO | WO 1995-017303 | | 6/1995 |
| WO | WO 1999-039224 | | 8/1999 |
| WO | WO 2000-048037 | | 8/2000 |
| WO | 2001/09227 | A1 | 2/2001 |
| WO | WO 2002-012404 | | 2/2002 |
| WO | WO 2005-116915 | | 12/2005 |
| WO | WO 2010-059416 | | 5/2010 |
| WO | WO 2012-112624 | | 8/2012 |
| WO | WO 2013-142239 | | 9/2013 |
| WO | WO 2014-008383 | | 1/2014 |
| WO | WO 2014-099367 | | 6/2014 |
| WO | WO 2017-151514 | | 9/2017 |
| WO | WO 2017-172564 | | 10/2017 |
| WO | WO 2018-043298 | | 3/2018 |
| WO | WO 2018-062541 | | 4/2018 |
| WO | WO 2018-130926 | | 7/2018 |
| WO | WO 2018-180177 | | 10/2018 |
| WO | WO 2019-130198 | | 7/2019 |
| WO | WO 2019-130199 | | 7/2019 |
| WO | WO 2019-234560 | | 12/2019 |
| WO | WO 2020-109926 | | 6/2020 |
| WO | WO 2020-240366 | | 12/2020 |

OTHER PUBLICATIONS

Gentle, "A subambient open roof surface under the mid-summer sun", Advanced Science, 2015, vol. 2, 1500119 (1-4pages).
Hossain, "A metamaterial emitter for highly efficient radiative cooling", Advanced Optical Materials, 2015, vol. 3, pp. 1047-1051.
Hossain, "Radiative cooling: Principles, progress and potentials", Advanced Science, 2016, vol. 3, 1500360 (1-10pages).
Li, "Radiative Cooling Paint", 2018, 7 pages.

(56) References Cited

OTHER PUBLICATIONS

Mandal, "Hierarchically porous polymer coatings for highly efficient passive daytime radiative cooling", Science, 2018, vol. 362, pp. 315-319.
Peoples, "A strategy of hierarchical particle sizes in nanoparticles composite for enhancing solar reflection", Internal journal of heat and mass transfer, 2019, vol. 131, pp. 487-494.
Raman, "Passive radiative cooling below ambient air temperature under direct sunlight", Nature, 2014, vol. 515, pp. 540-544.
Yang, "A dual-layer structure with record-high solar reflectance for daytime radiative cooling", Solar Energy, 2018, vol. 169, pp. 316-324.
Zhai, "Scalable-manufactured randomized glass-polymer hybrid metamaterial for daytime radiative cooling", Science, 2017, vol. 255, pp. 1062-1066.
Zhang, "Spectral radiative properties of micro/nanostructured materials", 40 pages.
Zhao, "Radiative sky cooling: fundamental principles, materials, and applications", Appl. Phys. Rev. 6, 2019, 021306 (41 pages).
International Search report for PCT International Application No. PCT/IB2020/055045 dated Sep. 2, 2020, 6 pages.

\* cited by examiner

US 11,906,252 B2

COMPOSITE COOLING FILM AND ARTICLE INCLUDING THE SAME

CROSS-REFERENCE TO RELATED APPLICATIONS

This application is a national stage filing under 35 U.S.C. 371 of PCT/2020/055045, filed May 27, 2020, which claims the benefit of U.S. Provisional Application No. 62/855,407, filed May 31, 2019, the disclosure of which is incorporated by reference in its entirety herein.

TECHNICAL FIELD

The present disclosure broadly relates passive radiative cooling films and articles.

BACKGROUND

The Earth's atmosphere has a semi-transparent window in the infrared wavelength range between 8 and 13 microns, i.e., the atmosphere's radiative emission is very weak in that window. Outside the atmospheric window, the Earth's atmosphere is highly emissive. Coincidentally, the atmospheric window falls within the peak thermal radiation of a black body defined by Planck's law at ambient temperature (i.e., around 300 degrees Kelvin (K)). This feature enables a potential passive cooling mechanism for a terrestrial body at ambient temperature by eliminating heat via radiative emission through the atmospheric window. The emitted radiation escapes high into the upper atmosphere where it is much colder than on the Earth's surface. The atmospheric window allows the outgoing radiative emission of surfaces having high solar reflectance to exceed its absorbed incoming atmospheric radiation and thus to passively cool below the ambient temperature. Along with the effect of the incoming atmospheric radiation, the cooling performance of a radiator depends on other factors such as, for example, the emissivity of the radiator, the nonradiative (conductive and convective) heat gain from the surrounding media and the incoming solar radiation during the daytime. Key properties for passive radiative cooling film include generally low emittance over the solar energy wavelengths of 0.3 microns to 2500 microns but high emittance over the atmospheric window wavelengths of 8 microns to 13 microns. According to Kirchhoff's law of thermal radiation, high absorbance correlates with high emittance.

SUMMARY

The present disclosure provides passive radiative cooling films that are suitable for use in cooling a substrate (e.g., a vehicle or building), even during daytime. The passive radiative cooling films combine highly efficient ultraviolet radiation (UV), visible radiation (VIS), and near-infrared (near-IR) reflectivity.

In one aspect, the present disclosure provides a composite cooling film comprising an antisoiling layer secured to a first major surface of a reflective microporous layer, wherein the reflective microporous layer comprises a first fluoropolymer and is diffusely reflective of electromagnetic radiation over a majority of wavelengths in the range of 400 to 2500 nanometers, and wherein the antisoiling layer has an outwardly facing antisoiling surface opposite the reflective microporous layer.

In another aspect, the present disclosure provides an article comprising the composite cooling film of any preceding claim secured to a substrate, wherein the antisoiling layer is further from the substrate than the reflective microporous layer.

As used herein:

"fluoropolymer" refers to any organic polymer containing fluorine;

"infrared" (IR) refers to infrared electromagnetic radiation having a wavelength of >700 nm to 1 mm, unless otherwise indicated;

"visible" (VIS) refers to visible electromagnetic radiation having a wavelength to from 400 nm to 700 nm, inclusive, unless otherwise indicated;

"ultraviolet" (UV) refers to ultraviolet electromagnetic radiation having a wavelength of at least 250 nm and up to but not including 400 nm, unless otherwise indicated;

"microporous" means having internal porosity (continuous and/or discontinuous) having average pore diameters of 50 to 10,000 nm;

"micro-voided" means having internal discrete voids having an average void diameter of 100 to 3000 nm;

"nonfluorinated polymer" refers to any organic polymer not containing fluorine;

"radiation" means electromagnetic radiation unless otherwise specified;

"secured to" means directly or indirectly affixed to (e.g., in direct contact with, or adhesively bonded to by a unitary layer of adhesive)

"average reflectance" means reflectance averaged over a specified wavelength range;

"reflective" and "reflectivity" refer to the property of reflecting light or radiation, especially reflectance as measured independently of the thickness of a material; and "reflectance" is the measure of the proportion of light or other radiation striking a surface at normal incidence which is reflected off it. Reflectivity typically varies with wavelength and is reported as the percent of incident light that is reflected from a surface (0 percent—no reflected light, 100—all light reflected. Reflectivity and reflectance are used interchangeably herein.

Absorbance can be measured with methods described in ASTM E903-12 "Standard Test Method for Solar Absorptance, Reflectance, and Transmittance of Materials Using Integrating Spheres". Absorbance measurements described herein were made by making transmission measurements as previously described and then calculating absorbance using Equation 1.

As used herein, the term "absorbance" refers to the base 10 logarithm of a ratio of incident radiant power to transmitted radiant power through a material. The ratio may be described as the radiant flux received by the material divided by the radiant flux transmitted by the material. Absorbance (A) may be calculated based on transmittance (T) according to Equation 1:

$$A = -\log_{10} T \quad (1)$$

Emissivity can be measured using infrared imaging radiometers with methods described in ASTM E1933-14 (2018) "Standard Practice for Measuring and Compensating for Emissivity Using Infrared Imaging Radiometers."

Features and advantages of the present disclosure will be further understood upon consideration of the detailed description as well as the appended claims.

Features and advantages of the present disclosure will be further understood upon consideration of the detailed description as well as the appended claims.

BRIEF DESCRIPTION OF THE DRAWINGS

FIG. 2A shows a perspective view of a cross section relative to xyz-axes. FIG. 2C shows the cross section of FIG. 2A in an xz-plane. FIG. 2B shows another cross section in a yz-plane.

Figure 1:
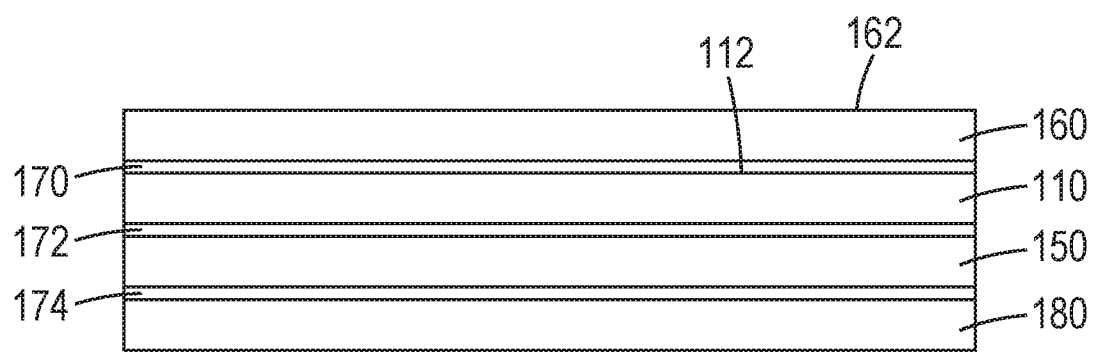
FIG. 1 is a schematic side view of an exemplary composite cooling film 100 according to one embodiment of the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

In one exemplary embodiment, shown in FIG. 1, exemplary composite cooling film 100 comprises a reflective microporous layer 110 having an antisoiling layer 160 secured thereto. Antisoiling layer 160 is secured to a major surface 112 of reflective microporous layer 110 such that the outwardly facing antisoiling surface 162 is opposite reflective microporous layer 110.

Optional infrared-reflective (IR-reflective) layer 150 is secured to reflective microporous layer 110 opposite antisoiling layer 160. Optional adhesive layers 170, 172 may adhere various components together as shown in FIG. 1. Optional adhesive layer 174 may be releasably bonded to optional liner 180. In one embodiment, after removal of optional liner 180, optional adhesive layer 174 may be bonded to a substrate (e.g., a vehicle or building, not shown) to be cooled.

Composite cooling films according to the present disclosure preferably have an average absorbance over the wavelength range 8-13 microns of at least 0.85, preferably at least 0.9, and more preferably at least 0.95, although this is not a requirement.

Reflective Microporous Layer

The reflective microporous layer may comprise a network of interconnected voids and/or discrete voids, which may be spherical, oblate, or some other shape. Primary functions of the reflective microporous layer include reflecting at least a portion of visible and infrared radiation of the solar spectrum and to emit thermal radiation in the atmospheric window (i.e., wavelengths of 8 to 13 microns).

Accordingly, the reflective microporous layer has voids that are of appropriate size that they diffusely reflect light with wavelengths in the 400 nm to 700 nm, preferably 400 nm to 2500 nm, wavelength range. Generally, this means that the void sizes should be in a size range (e.g., 100 to 3000 nm) capable of reflecting light in the 400 nm to 2500 nm wavelength range. Preferably, a range of void sizes corresponding to those dimensions is present so that effective broadband reflection with be achieved.

Reflectivity of the reflective microporous layer is generally a function of the number of polymer film/void interfaces, since reflection (typically diffuse reflection) occurs at those locations. Accordingly, the porosity and thickness of the reflective microporous layer will be important variable. In general, higher porosity and higher thickness correlate with higher reflectivity. However, for cost considerations film thickness is preferably minimized, although this is not a requirement. Accordingly, the thickness of the reflective microporous layer is typically in the range of 10 microns to 500 microns, preferably in the range of 10 microns to 200 microns, although this is not a requirement. Likewise, the porosity of the reflective microporous layer is typically in the range of 10 volume percent to 90 volume percent, preferably in the range of 20 volume percent to 85 volume percent, although this is not a requirement.

Figure 12:
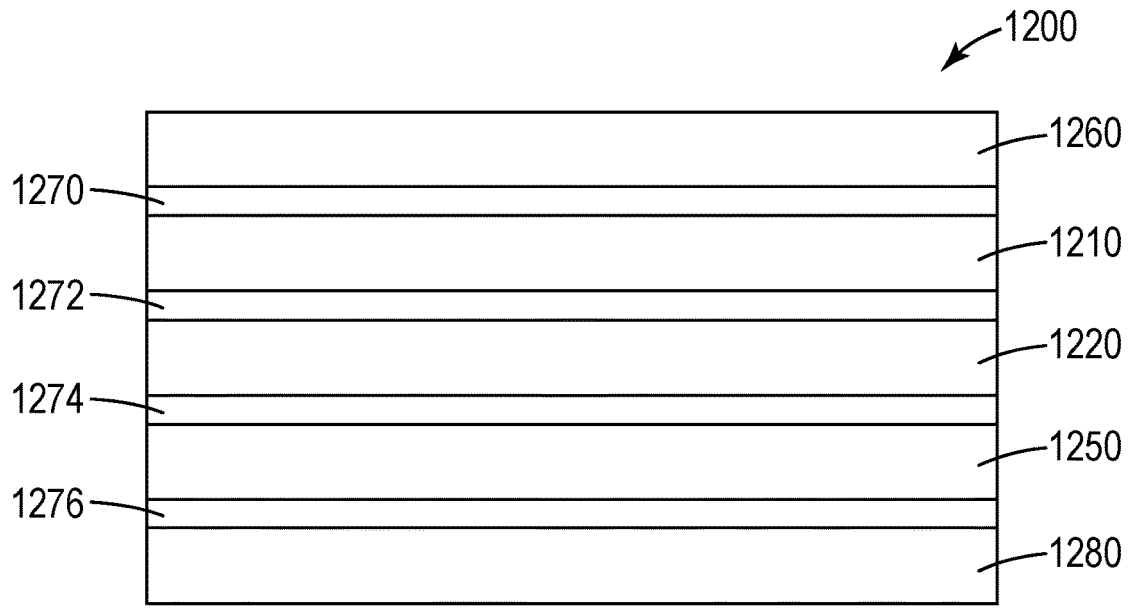
FIG. 12 is a schematic side view of an exemplary composite cooling film 1200 according to one embodiment of the present disclosure.

In some embodiments, shown in FIG. 12, an auxiliary reflective microporous layer may be secured to the reflective microporous layer on a major surface opposite the antisoiling layer. The use of such an auxiliary reflective microporous layer may be to reduce cost, by reducing the necessary thickness of the reflective microporous layer and functional replacing it with a nonfluorinated polymer substitute.

Referring now to FIG. 12, exemplary composite cooling film 1200 comprises a reflective microporous layer 1210 having an antisoiling layer 1260 secured thereto. Antisoiling layer 1260 is secured to reflective microporous layer 1210 (which contains fluoropolymer) such that the antisoiling layer 1260 is opposite auxiliary reflective microporous layer 1220 (which does not contain fluoropolymer). Optional infrared-reflective (IR-reflective) layer 1250 is secured to auxiliary reflective microporous layer 1210 opposite reflective microporous layer 1210. Optional adhesive layers 1270, 1272, 1274 may adhere various the components together. Optional adhesive layer 1276, opposite antisoiling layer 1260, may be releasably bonded to optional liner 1280. In one embodiment, after removal of optional liner 1280, optional adhesive layer 1276 may be bonded to a substrate (e.g., a vehicle or building, not shown) to be cooled.

Exemplary materials that may be useful at least one (preferably only one) of the reflective microporous layer (which contains at least one fluoropolymer) or an auxiliary reflective microporous layer (which does not include a fluoropolymer) are set forth below. Selection of which microporous material to include in which layer(s) will be apparent in view of the preceding discussion.

Microporous polymer films suitable for use as the reflective microporous layer are known in the art and are described, for example, in U.S. Pat. No. 8,962,214 (Smith et al.) entitled "Microporous PVDF Films", in U.S. Pat. No. 10,240,013 (Mrozinski et al.) entitled "Microporous Material from Ethylene-Chlorotrifluoroethylene Copolymer and Method for Making Same", and in U.S. Pat. No. 4,874,567 (Lopatin et al.) entitled "Microporous Membranes from Polypropylene". These films may have average pore diameters of at least 0.05 microns.

In certain embodiments, the reflective microporous layer includes at least one Thermally Induced Phase Separation (TIPS) material. The pore size of TIPS materials can be generally controlled due to the ability to select the extent of stretching of the layer. TIPS materials are relatively inexpensive to make, and methods for making them are known to the skilled practitioner. For example, various materials and methods are described in detail in U.S. Pat. No. 4,726,989 (Mrozinski), U.S. Pat. No. 5,238,623 (Mrozinski), U.S. Pat. No. 5,993,954 (Radovanovic et al.), and U.S. Pat. No. 6,632,850 (Hughes et al.). Reflective microporous layers for use in aspects of the present disclosure also include Solvent Induced Phase Separated (SIPS) materials (e.g. U.S. Pat. No. 4,976,859, Wechs) and other reflective microporous layers made by extrusion, extrusion/stretching and extrusion/stretching/extraction processes. Suitable reflective microporous layers that may be formed by SIPS include for example and without limitation polyvinylidene fluoride (PVDF), polyether sulfone (PES), polysulfone (PS), polyacrylonitrile (PAN), nylon (i.e., polyamide), cellulose acetate, cellulose nitrate, regenerated cellulose, and polyimide. Suitable reflective microporous layers that may be formed by stretching techniques (e.g. U.S. Pat. No. 6,368,742, Fisher et al.) include for example and without limitation polytetrafluoroethylene (PTFE) and polypropylene.

In certain embodiments, the reflective microporous layer comprises a thermoplastic polymer, for instance polyethylene, polypropylene, 1-octene, styrene, polyolefin copolymer, polyamide, poly-1-butene, poly-4-methyl-1-pentene, polyethersulfone, ethylene tetrafluoroethylene, polyvinylidene fluoride, polysulfone, polyacrylonitrile, polyamide, cellulose acetate, cellulose nitrate, regenerated cellulose, polyvinyl chloride, polycarbonate, polyethylene terephthalate, polyimide, polytetrafluoroethylene, ethylene chlorotrifluoroethylene, or combinations thereof.

Materials suitable for use as the reflective microporous layer include non-woven fibrous layers.

Polymeric non-woven layers can be made using a melt blowing process. Melt blown non-woven fibrous layers can contain very fine fibers. In melt-blowing, one or more thermoplastic polymer streams are extruded through a die containing closely arranged orifices. These polymer streams are attenuated by convergent streams of hot air at high velocities to form fine fibers, which are then collected on a surface to provide a melt-blown non-woven fibrous layer. Depending on the operating parameters chosen, the collected fibers may be semi-continuous or essentially discontinuous.

Polymeric non-woven layers can also be made by a process known as melt spinning. In melt spinning, the non-woven fibers are extruded as filaments out of a set of orifices and allowed to cool and solidify to form fibers. The filaments are passed through an air space, which may contain streams of moving air, to assist in cooling the filaments and passing through an attenuation (i.e., drawing) unit to at least partially draw the filaments. Fibers made through a melt spinning process can be "spunbonded," whereby a web comprising a set of melt-spun fibers are collected as a fibrous web and optionally subjected to one or more bonding operations to fuse the fibers to each other. Melt-spun fibers are generally larger in diameter than melt-blown fibers.

Polymers suitable for use in a melt blown or melt spinning process include polyolefins such as polypropylene and polyethylene, polyester, polyethylene terephthalate, polybutylene terephthalate, polyamide, polyurethane, polybutene, polylactic acid, polyphenylene sulfide, polysulfone, liquid crystalline polymer, polyethylene-co-vinyl acetate, polyacrylonitrile, cyclic polyolefin, and copolymers and blends thereof. In some embodiments, the polymer, copolymer, or blend thereof represents at least 35% of the overall weight of the directly formed fibers present in the non-woven fibrous layer.

Non-woven fibers can be made from a thermoplastic semi-crystalline polymer, such as a semi-crystalline polyester. Useful polyesters include aliphatic polyesters. Non-woven materials based on aliphatic polyester fibers can be especially advantageous in resisting degradation or shrinkage at high temperature applications. This property can be achieved by making the non-woven fibrous layer using a melt blowing process where the melt blown fibers are subjected to a controlled in-flight heat treatment operation immediately upon exit of the melt blown fibers from the multiplicity of orifices. The controlled in-flight heat treatment operation takes place at a temperature below a melting temperature of the portion of the melt blown fibers for a time sufficient to achieve stress relaxation of at least a portion of the molecules within the portion of the fibers subjected to the controlled in-flight heat treatment operation. Details of the in-flight heat treatment are described in U.S. Patent Publication No. 2016/0298266 (Zillig et al.).

Non-woven fibrous layers that may be used for the reflective microporous layer include ones made using an air laid process, in which a wall of air blows fibers onto a perforated collection drum having negative pressure inside the drum. The air is pulled though the drum and the fibers are collected on the outside of the drum where they are removed as a web. Exemplary embodiments of microporous membrane fabricated with non-woven fibers are highly reflective white papers comprising polysaccharides. Micro-porous polysaccharide white papers having greater than 90% reflectance over visible wavelengths of 400 to 700 nm are available from International Paper, Memphis, Tennessee, under the trade designations IP ACCENT OPAQUE DIGITAL (100 lbs), IP ACCENT OPAQUE DIGITAL (100 lbs), HAMMERMILL PREMIUM COLOR COPY (80 lbs), and HAMMERMILL PREMIUM COLOR COPY (100 lbs). Titania, $BaSO_4$ and other white pigments are often added to paper to increase their reflection of visible light (400-700 nm).

Other non-woven fibrous layers that may be used for the reflective microporous layer include those made using a wet laid process. A wet laying or "wetlaid" process comprises (a) forming a dispersion comprising one or more types of fibers, optionally a polymeric binder, and optionally a particle filler(s) in at least one dispersing liquid (preferably water); and (b) removing the dispersing liquid from the dispersion.

Suitable fibers for use in air laid and wet laid processes include those made from natural (animal or vegetable) and/or synthetic polymers, including thermoplastic and solvent-dispersible polymers. Useful polymers include wool; silk; cellulosic polymers (e.g., cellulose and cellulose derivatives); fluorinated polymers (e.g., polyvinyl fluoride, polyvinylidene fluoride, copolymers of vinylidene fluoride such as poly(vinylidene fluoride-co-hexafluoropropylene), and copolymers of chlorotrifluoroethylene such as poly (ethylene-co-chlorotrifluoroethylene)); chlorinated polymers; polyolefins (e.g., polyethylene, polypropylene, poly-1-butene, copolymers of ethylene and/or propylene, with 1-butene, 1-hexene, 1-octene, and/or 1-decene (e.g., poly (ethylene-co-1-butene), poly(ethylene-co-1-butene-co-1-hexene)); polyisoprenes; polybutadienes; polyamides (e.g., nylon 6, nylon 6,6, nylon 6,12, poly(iminoadipoyliminohexamethylene), poly(iminoadipoyliminodecamethylene), or polycaprolactam); polyimides (e.g., poly(pyromellitimide)); polyethers; polyether sulfones (e.g., poly(diphenyl ether sulfone), or poly(diphenyl sulfone-co-diphenylene oxide sulfone)); polysulfones; polyvinyl acetates; copolymers of vinyl acetate (e.g., poly(ethylene-co-vinyl acetate), copolymers in which at least some of the acetate groups have been hydrolyzed to provide various poly(vinyl alcohols) including poly(ethylene-co-vinyl alcohol)); polyphosphazenes; polyvinyl esters; polyvinyl ethers; poly(vinyl alcohols); polyaramids (e.g., para-aramids such as poly(paraphenylene terephthalamide) and fibers sold under the trade designation KEVLAR by DuPont Co., Wilmington, Delaware, pulps of which are commercially available in various grades based on the length of the fibers that make up the pulp such as, e.g., KEVLAR 1F306 and KEVLAR 1F694, both of which include aramid fibers that are at least 4 mm in length); polycarbonates; and combinations thereof. Nonwoven fibrous layers may be calendered to adjust the pore size.

The use of a reflective micro-voided polymer film as the reflective microporous layer may provide a reflectance that is even greater than that of a silvered mirror. In some embodiments, a reflective micro-voided polymer film reflects a maximum amount of solar energy in a range from 400 to 2500 nanometers (nm). In particular, the use of a fluoropolymer blended into the micro-voided polymer film may provide a reflectance that is greater than other conventional multilayer optical films. Further, inorganic particles including barium sulfate, calcium carbonate, silica, alumina, aluminum silicate, zirconia, and titania may be blended into the micro-voided polymer film for providing high solar reflectance in solar radiation spectra of 0.4 to 2.5 microns and high absorbance in the atmospheric window of 8 to 13 microns. In some embodiments, the article may form part of a cooling panel that may be disposed on the exterior of at least part of a building or a heat transfer system. The heat transfer system can cool a fluid, liquid or gas, which can then be used to remove heat from a building or vehicle, including an electric vehicle battery. The outer layer may be suitable for protecting the reflective microporous layer, particularly, in outdoor environments. Including the outer layer may also facilitate less soiling of the surface and ease of cleaning the surface.

Exemplary polymers useful for forming the reflective micro-voided polymer film include polyethylene terephthalate (PET) available from 3M Company. Modified PET copolyesters including PETG available, for example, as SPECTAR 14471 and EASTAR GN071 from Eastman Chemical Company, Kingsport, Tennessee, and PCTG available, for example, as TIGLAZE ST and EB0062 also from Eastman Chemical Company are also useful high refractive index polymers. The molecular orientation of PET and PET modified copolyesters may be increased by stretching which increases its in-plane refractive indices providing even more reflectivity in the multilayer optical film. In general, an incompatible polymer additive, or inorganic particle additive, is blended into the PET host polymer at levels of at least 10 wt. %, at least 20 wt. %, at least 30 wt. %, at least 40 wt. %, or even at least 49 wt. % during extrusion prior to stretching to nucleate voids during the stretching process. Suitable incompatible polymers additives for PET include: fluoropolymers, polypropylenes, polyethylenes, and other polymers which do not adhere well to PET. Similarly, if polypropylene is the host polymer, then incompatible polymer additives such as PET or fluoropolymers can be added to the polypropylene host polymer at levels of at least 10 wt. %, at least 20 wt. %, at least 30 wt. %, at least 40 wt. %, or even at least 49 wt. % during extrusion prior to stretching to nucleate voids during the stretching process. Exemplary suitable inorganic particle additives for nucleating voids in micro-voided polymer films include titania, silica, alumina, aluminum silicate, zirconia, calcium carbonate, barium sulfate, and glass beads and hollow glass bubbles, although other inorganic particles and combinations of inorganic particles may also be used. Crosslinked polymeric microspheres can also be used instead of inorganic particles. Inorganic particles can be added to the host polymer at levels of at least 10 wt. %, at least 20 wt. %, at least 30 wt. %, at least 40 wt. %, or even at least 49 wt. % during extrusion prior to stretching to nucleate voids during the stretching process. If present, the inorganic particles preferably have a volume average particle diameter of 5 nm to 1 micron, although other particle sizes may also be used. Hard particles including glass beads and/or glass bubbles can be present on the surface layer of UV mirror skin layer or the antisoiling layer to provide scratch resistance. In some embodiments, glass beads and/or glass bubbles may even protrude from the surface as hemispheres or even quarter spheres.

In some embodiments, micro-voided polymer films comprise a fluoropolymer continuous phase. Exemplary suitable polymers include ECTFE, PVDF, and copolymers of tetrafluoroethylene, hexafluoropropylene, and vinylidene fluoride such as, for example, those available under the trade designation THV from 3M Company.

Exemplary micro-voided PET film comprising barium sulfate is available as LUMIRROR XJSA2 from Toray Plastics (America) Inc., North Kingstown, Rhode Island LUMIRROR XJSA2 comprises $BaSO_4$ inorganic additive to increase its reflectivity of visible light (400-700 nm). Additional exemplary reflective micro-voided polymer films are available from Mitsubishi Polymer Film, Inc., Greer, South Carolina, as HOSTAPHAN V54B, HOSTAPHAN WDI3, and HOSTAPHAN W270.

Exemplary micro-voided polyolefin sheets are described in, for example, U.S. Pat. No. 6,261,994 (Bourdelais et al.).

The reflective microporous layer is diffusely reflective, for example, of visible radiation over a majority of wavelengths in the range of 400 to 700 nanometers, inclusive. In some embodiments, the reflective microporous layer may have an average reflectance of at least 85% (in some embodiments, at least 90%, at least 91%, at least 92%, at least 93%, at least 94%, at least 95%, at least 96%, at least 97%, at least 98%, at least 99%, or even at least 99.5%) over a wavelength range of at least 400 nm up to 700 nm.

The reflectivity of the reflective microporous layer may be reflective over a broader wavelength range. Accordingly, in some embodiments, the reflectivity of the microporous polymer layer may have an average reflectivity of at least 85% (in some embodiments, at least 90%, at least 91%, at least 92%, at least 93%, at least 94%, at least 95%, at least 96%, at least 97%, at least 98%, at least 99%, or even at least 99.5%) over a wavelength range of at least 400 nm up to 2.5 micrometers, preferably at least 300 nm to 3.0 micrometers, although this is not a requirement.

Antisoiling Layer

The antisoiling layer provides a degree of protection from soil accumulation on the surface that could impede the function of the composite cooling film (e.g., by absorbing solar radiation).

Typically, the antisoiling layer is a polymer film, preferably comprising one or more repellent polymers such as, for example, fluoropolymers. Examples of comonomers for making fluoropolymers that may be used include TFE, HFP, THV, PPVE. Exemplary fluoropolymers for use as the antisoiling layer include PVDF, ECTFE, ETFE, PFA, FEP, PTFE, HTE, and combinations thereof. In some embodiments, the fluoropolymer includes FEP. In some embodiments, the fluoropolymer includes PFA.

In some embodiments, the antisoiling layer is applied as a coating onto the reflective microporous layer. Numerous applied antisoiling compositions are know in the art including, for example, those described in U.S Pat. Appln. Pubs. 2015/0175479 (Brown et al.), 2005/0233070 (Pellerite et al.), U.S. Pat. No. 6,277,485 (Invie et al.), and WO 02/12404 (Liu et al.)

In some embodiments, the outward facing surface of the antisoiling layer (i.e., the antisoiling surface) may be micro-structured and/or nano-structured over some or all of its surface; for example, as described in PCT International Application No. PCT/IB2018/060527, filed Dec. 21, 2018 and entitled "ANTISOILING SURFACE STRUCTURES".

In some embodiments, the nano-structure may be superimposed on the micro-structure on the surface of the antisoiling layer.

The antisoiling layer has a major surface (i.e., an antisoiling surface) that includes micro-structures and/or nano-structures. The micro-structures may be arranged as a series of alternating micro-peaks and micro-spaces. The size and shape of the micro-spaces between micro-peaks may mitigate the adhesion of dirt particles to the micro-peaks. The nano-structures may be arranged as at least one series of nano-peaks disposed on at least the micro-spaces. The micro-peaks may be more durable to environmental effects than the nano-peaks. Because the micro-peaks are spaced only by a micro-space, and the micro-spaces are significantly taller than the nano-peaks, the micro-peaks may serve to protect the nano-peaks on the surface of the micro-spaces from abrasion.

In reference to the antisoiling layer, the term or prefix "micro" refers to at least one dimension defining a structure or shape being in a range from 1 micrometer to 1 millimeter. For example, a micro-structure may have a height or a width that is in a range from 1 micrometer to 1 millimeter.

As used herein, the term or prefix "nano" refers to at least one dimension defining a structure or a shape being less than 1 micrometer. For example, a nano-structure may have at least one of a height or a width that is less than 1 micrometer.

Figure 2A:
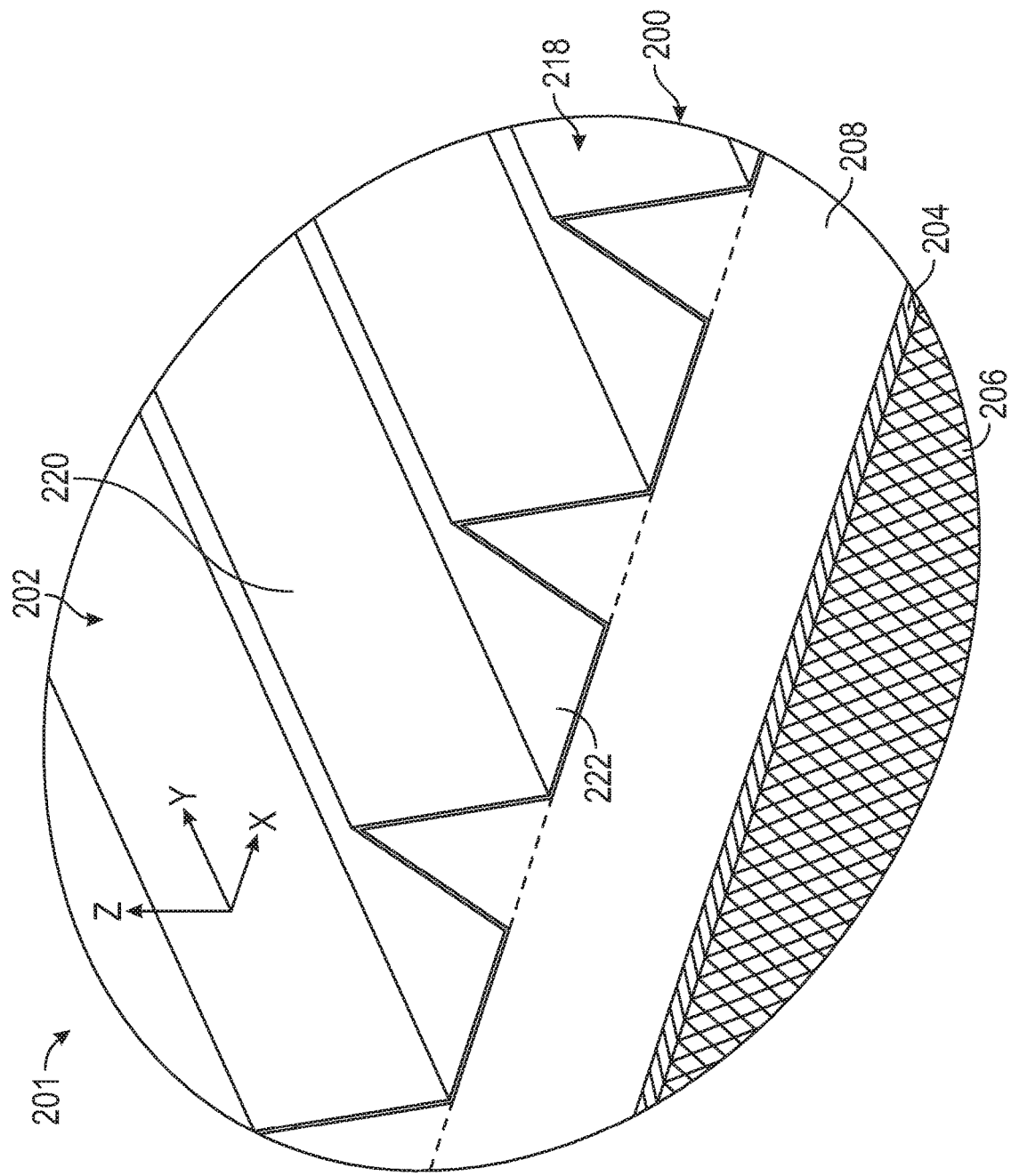
FIGS. 2A, 2B, and 2C are views of an antisoiling surface structure having micro-structures.
Figure 2B:
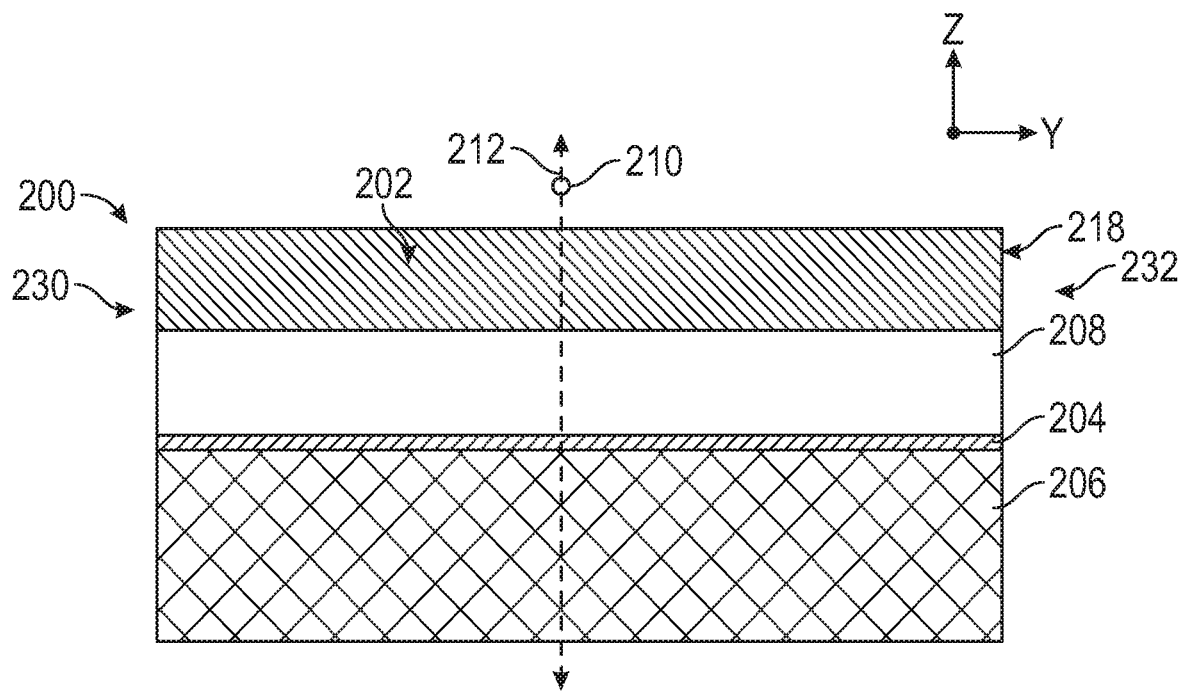
Figure 2C:
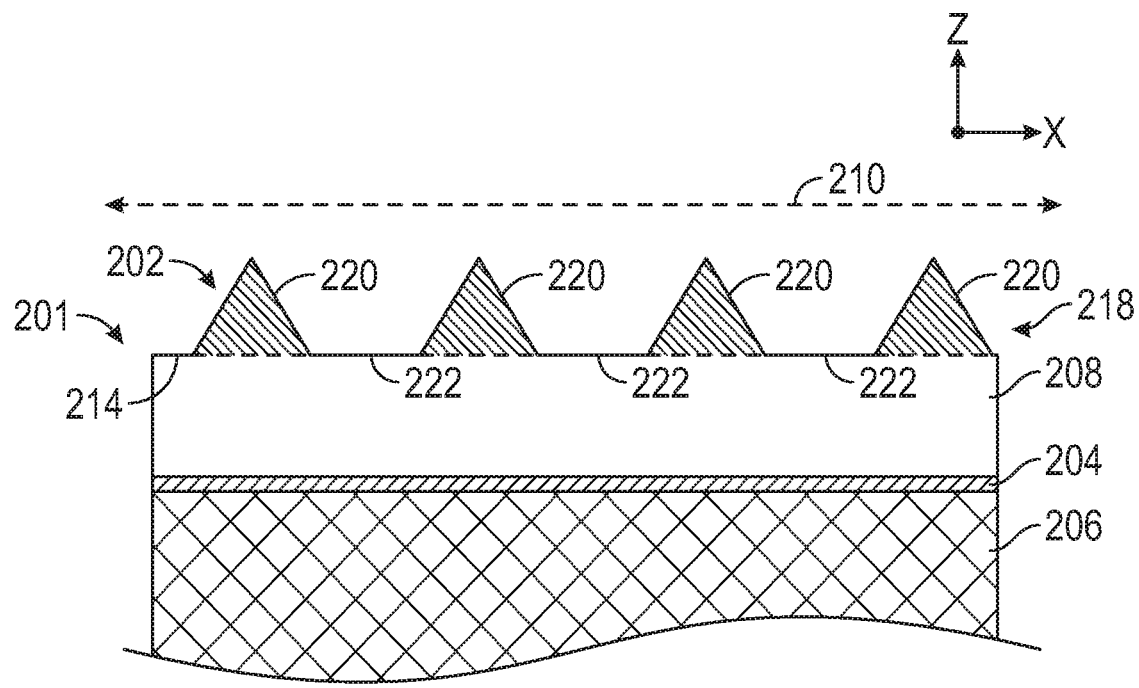

FIGS. 2A, 2B, and 2C show cross-sections 200, 201 of an antisoiling surface structure, shown as antisoiling layer 208 having antisoiling surface 202 defined by a series of micro-structures 218. The cross-sections 200, 201 also show substrate 206 and adhesive 204 between the antisoiling layer 208 and the substrate. In particular, FIG. 2A shows a perspective view of the cross section 201 relative to xyz-axes. FIG. 2C shows cross section 201 in an xz-plane parallel to axis 210. FIG. 2B shows cross section 200 in a yz-plane orthogonal to cross section 201 and orthogonal to axis 210. Antisoiling surface 202 is depicted in FIGS. 2A-2C as if layer 208 were lying on a flat horizontal surface. Layer 208, however, may be flexible and may conform to substrates that are not flat.

Layer 208 may be formed of any suitable material capable of defining micro-structures 218, which may at least partially define antisoiling surface 202. Layer 208 may be transparent to various frequencies of light (e.g., light having a wavelength anywhere in the range of 400 to 3000 nm). In some embodiments, layer 208 may include an UV stable material. In some embodiments, layer 208 may include a polymer material, such as a fluoropolymer or a polyolefin polymer.

Antisoiling surface 202 may extend along axis 210, for example, parallel or substantially parallel to the axis. Plane 212 may contain axis 210, for example, parallel or intersecting such that axis 210 is in plane 212. Both axis 210 and plane 212 may be imaginary constructs used herein to illustrate various features related to antisoiling surface 202. For example, the intersection of plane 212 and antisoiling surface 202 may define line 214 describing a cross-sectional profile of the surface as shown in FIG. 2C that includes micro-peaks 220 and micro-spaces 222 as described herein in more detail. Line 214 may include at least one straight segment or curved segments.

Line 214 may at least partially define series of micro-structures 218. Micro-structures 218 may be three-dimensional (3D) structures disposed on layer 208, and line 214 may describe only two dimensions (e.g., height and width) of that 3D structure. As can be seen in FIG. 2B, micro-structures 218 may have a length that extends along surface 202 from one side 230 to another side 232.

Micro-structures 218 may include a series of alternating micro-peaks 220 and micro-spaces 222 along, or in the direction of, axis 210, which may be defined by, or included in, line 214. The direction of axis 210 may coincide with a width dimension. Micro-spaces 222 may each be disposed between pair of micro-peaks 220. In other words, plurality of micro-peaks 220 may be separated from one another by at least one micro-spaces 222. In at least one embodiments, at least one pair of micro-peaks 220 may not include micro-space 222 in-between. Pattern of alternating micro-peaks 220 and micro-spaces 222 may be described as a "skipped tooth riblet" (STR). Each of micro-peaks 220 and micro-spaces 222 may include at least one straight segment or curved segment.

A slope of line 214 (e.g., rise over run) may be defined relative to the direction of axis 210 as an x-coordinate (run) and relative to the direction of plane 212 as a y-axis (rise).

A maximum absolute slope may be defined for at least one portion of line 214. As used herein, the term "maximum absolute slope" refers to a maximum value selected from the absolute value of the slopes throughout a particular portion of line 214. For example, the maximum absolute slope of one micro-space 222 may refer to a maximum value selected from calculating the absolute values of the slopes at every point along line 214 defining the micro-space.

A line defined the maximum absolute slope of each micro-space 222 may be used to define an angle relative to axis 210. In some embodiments, the angle corresponding to the maximum absolute slope may be at most 30 (in some embodiments, at most 25, 20, 15, 10, 5, or even at most 1) degrees. In some embodiments, the maximum absolute slope of at least some (in some embodiments, all) of micro-peaks 220 may be greater than the maximum absolute slope of at least some (in some embodiments, all) of micro-spaces 222.

In some embodiments, line 214 may include boundary 216 between each adjacent micro-peak 220 and micro-space 222. Boundary 216 may include at least one of straight segment or curved segment. Boundary 216 may be a point along line 214. In some embodiments, boundary 216 may include a bend. The bend may include the intersection of two segments of line 214. The bend may include a point at which line 214 changes direction in a locale (e.g., a change in slope between two different straight lines). The bend may also include a point at which line 214 has the sharpest change in direction in a locale (e.g., a sharper turn compared to adjacent curved segments). In some embodiments, boundary 216 may include an inflection point. An inflection point may be a point of a line at which the direction of curvature changes.

Figure 3:
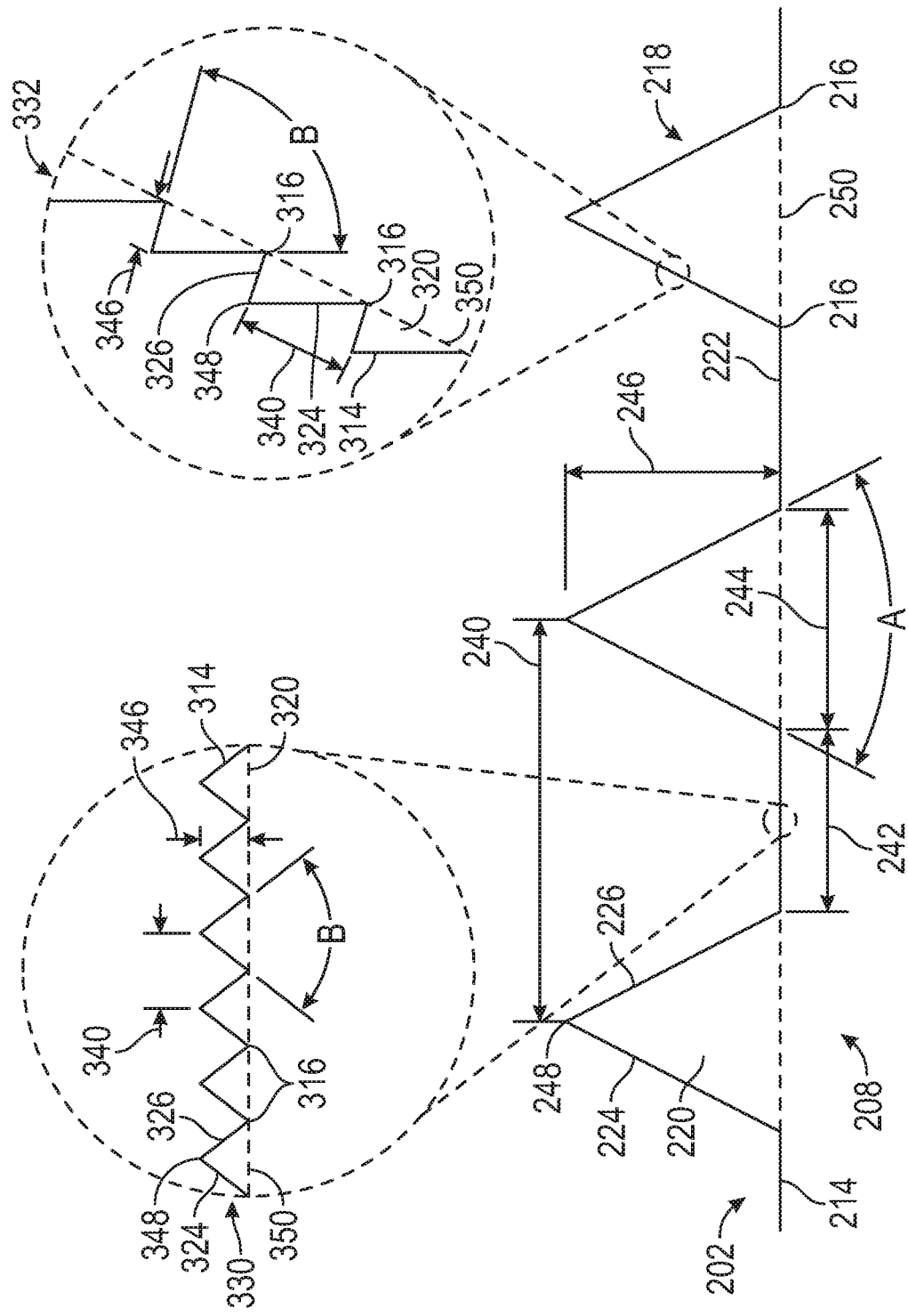
FIG. 3 is a cross-sectional illustration of various nano-structures of the antisoiling surface structure of FIGS. 2A-2C in an xz-plane.

FIG. 3 shows antisoiling surface 202 of layer 208 with nano-structures 330, 332, which are visible in two magnified overlays. At least one micro-peak 220 may include at least one first micro-segment 224 or at least one second micro-segment 226. Micro-segments 224, 226 may be disposed on opposite sides of apex 248 of micro-peak 220. Apex 248 may be, for example, the highest point or local maxima of line 214. Each micro-segment 224, 226 may include at least one: straight segment or curved segment.

Line 214 defining first and second micro-segments 224, 226 may have a first average slope and a second average slope, respectively. The slopes may be defined relative to baseline 250 as an x-axis (run), wherein an orthogonal direction is the z-axis (rise).

As used herein, the term "average slope" refers to an average slope throughout a particular portion of a line. In some embodiments, the average slope of first micro-segment 224 may refer to the slope between the endpoints of the first micro-segment. In some embodiments, the average slope of first micro-segment 224 may refer to an average value calculated from the slopes measured at multiple points along the first micro-segment.

In general, the micro-peak first average slope may be defined as positive and the micro-peak second average slope may be defined as negative. In other words, the first average slope and the second average slope have opposite signs. In some embodiments, the absolute value of the micro-peak first average slope may be equal to the absolute value of the micro-peak second average slope. In some embodiments, the absolute values may be different. In some embodiments, the absolute value of each average slope of micro-segments 224, 226 may be greater than the absolute value of the average slope of micro-space 222.

Angle A of micro-peaks 220 may be defined between the micro-peak first and second average slopes. In other words, the first and second average slopes may be calculated and then an angle between those calculated lines may be determined. For purposes of illustration, angle A is shown as relating to first and second micro-segments 224, 226. In some embodiments, however, when the first and second micro-segments are not straight lines, the angle A may not necessarily be equal to the angle between two micro-segments 224, 226.

Angle A may be in a range to provide sufficient antisoiling properties for surface 202. In some embodiments, angle A may be at most 120 (in some embodiments, at most 110, 100, 95, 90, 85, 80, 75, 70, 65, 60, 55, 50, 45, 40, 35, 30, 25, 20, or even at most 10) degrees. In some embodiments, angle A is at most 85 (in some embodiments, at most 75) degrees. In some embodiments, angle A is, at the low end, at least 30 (in some embodiments, at least 25, 40, 45, or even at least 50) degrees. In some embodiments, angle A is, at the high end, at most 75 (in some embodiments, at most 60, or even at most 55) degrees.

Micro-peaks 220 may be any suitable shape capable of providing angle A based on the average slopes of micro-segments 224, 226. In some embodiments, micro-peaks 220 are generally formed in the shape of a triangle. In some embodiments, micro-peaks 220 are not in the shape of a triangle. The shape may be symmetrical across a z-axis intersecting apex 248. In some embodiments, the shape may be asymmetrical.

Each micro-space 222 may define micro-space width 242. Micro-space width 242 may be defined as a distance between corresponding boundaries 216, which may be between adjacent micro-peaks 220.

A minimum for micro-space width 242 may be defined in terms of micrometers. In some embodiments, micro-space width 242 may be at least 10 (in some embodiments, at least 20, 25, 30, 40, 50, 60, 70, 75, 80, 90, 100, 150, 200, or even at least 250) micrometers. In some applications, micro-space width 242 is, at the low end, at least 50 (in some embodiments, at least 60) micrometers. In some applications, micro-space width 242 is, at the high end, at most 90 (in some embodiments, at most 80) micrometers. In some applications, micro-space width 242 is 70 micrometers.

As used herein, the term "peak distance" refers to the distance between consecutive peaks, or between the closest pair of peaks, measured at each apex or highest point of the peak.

Micro-space width 242 may also be defined relative to micro-peak distance 240. In particular, a minimum for micro-space width 242 may be defined relative to corresponding micro-peak distance 240, which may refer to the distance between the closest pair of micro-peaks 220 surrounding micro-space 222 measured at each apex 248 of the micro-peaks. In some embodiments, micro-space width 242 may be at least 10% (in some embodiments, at least 20%, 25%, 30%, 40%, 50%, 60%, 70%, 80%, or even at least 90%) of the maximum for micro-peak distance 240. In some embodiments, the minimum for micro-space width 242 is, at the low end, at least 30% (in some embodiments, at least 40%) of the maximum for micro-peak distance 240. In some embodiments, the minimum for micro-space width 242 is, at the high end, at most 60% (in some embodiments, at most 50%) of the maximum for micro-peak distance 240. In some embodiments, micro-space width 242 is 45% of micro-peak distance 240.

A minimum the micro-peak distance 240 may be defined in terms of micrometers. In some embodiments, micro-peak distance 240 may be at least 1 (in some embodiments, at least 2, 3, 4, 5, 10, 25, 50, 75, 100, 150, 200, 250, or even at least 500) micrometers. In some embodiments, micro-peak distance 240 is at least 100 micrometers.

A maximum for micro-peak distance 240 may be defined in terms of micrometers. Micro-peak distance 240 may be at most 1000 (in some embodiments, at most 900, 800, 700, 600, 500, 400, 300, 250, 200, 150, 100, or even at most 50) micrometers. In some embodiments, micro-peak distance 240 is, at the high end, at most 200 micrometers. In some embodiments, micro-peak distance 240 is, at the low end, at least 100 micrometers. In some embodiments, micro-peak distance 240 is 150 micrometers.

Each micro-peak 220 may define micro-peak height 246. Micro-peak height 246 may be defined as a distance between baseline 350 and apex 248 of micro-peak 220. A minimum may be defined for micro-peak height 246 in terms of micrometers. In some embodiments, micro-peak height 246 may be at least 10 (in some embodiments, at least 20, 25, 30, 40, 50, 60, 70, 80, 90, 100, 150, 200, or even at least 250) micrometers. In some embodiments, micro-peak height 246 is at least 60 (in some embodiments, at least 70) micrometers. In some embodiments, micro-peak height 246 is 80 micrometers.

Plurality of nano-structures 330, 332 may be defined at least partially by line 214. Plurality of nano-structures 330 may be disposed on at least one or micro-space 222. In particular, line 314 defining nano-structures 330 may include at least one series of nano-peaks 320 disposed on at least one micro-space 222. In some embodiments, at least one series of nano-peaks 320 of plurality of nano-structures 332 may also be disposed on at least one micro-peak 220.

Due to at least their difference in size, micro-structures 218 may be more durable than nano-structures 330, 332 in terms of abrasion resistance. In some embodiments, plurality of nano-structures 332 are disposed only on micro-spaces 222 or at least not disposed proximate to or adjacent to apex 248 of micro-peaks 220.

Each nano-peak 320 may include at least one of first nano-segment 324 and second nano-segment 326. Each nano-peak 320 may include both nano-segments 324, 326. Nano-segments 324, 326 may be disposed on opposite sides of apex 348 of nano-peak 320.

First and second nano-segments 324, 326 may define a first average slope and a second average slope, respectively, which describe line 314 defining the nano-segment. For nano-structures 330, 332, the slope of line 314 may be defined relative to baseline 350 as an x-axis (run), wherein an orthogonal direction is the z-axis (rise).

In general, the nano-peak first average slope may be defined as positive and the nano-peak second average slope may be defined as negative, or vice versa. In other words, the first average slope and the second average slope at least have opposite signs. In some embodiments, the absolute value of the nano-peak first average slope may be equal to the absolute value of the nano-peak second average slope (e.g., nano-structures 330). In some embodiments, the absolute values may be different (e.g., nano-structures 332).

Angle B of nano-peaks 320 may be defined between lines defined by the nano-peak first and second average slopes. Similar to angle A, angle B as shown is for purposes of illustration and may not necessarily equal to any directly measured angle between nano-segments 324, 326.

Angle B may be a range to provide sufficient antisoiling properties for surface 202. In some embodiments, angle B may be at most 120 (in some embodiments, at most 110, 100, 90, 85, 80, 75, 70, 65, 60, 55, 50, 45, 40, 35, 30, 25, 20, or even at most 10) degrees. In some embodiments, angle B is, at the high end, at most 85 (in some embodiments, at most 80, or even at most 75) degrees. In some embodiments, angle B is, at the low end, at least 55 (in some embodiments, at least 60, or even at least 65) degrees. In some embodiments, angle B is 70 degrees.

Angle B may be the same or different for each nano-peak 320. For example, in some embodiments, angle B for nano-peaks 320 on micro-peaks 220 may be different than angle B for nano-peaks 320 on micro-spaces 222.

Nano-peaks 320 may be any suitable shape capable of providing angle B based on lines defined by the average slopes of nano-segments 324, 326. In some embodiments, nano-peaks 320 are generally formed in the shape of a triangle. In at least one embodiments, nano-peaks 320 are not in the shape of a triangle. The shape may be symmetrical across apex 348. For example, nano-peaks 320 of nano-structures 330 disposed on micro-spaces 222 may be symmetrical. In at least one embodiments, the shape may be asymmetrical. For example, nano-peaks 320 of nano-structures 332 disposed on micro-peaks 220 may be asymmetrical with one nano-segment 324 being longer than other nano-segment 326. In some embodiments, nano-peaks 320 may be formed with no undercutting.

Each nano-peak 320 may define nano-peak height 346. Nano-peak height 346 may be defined as a distance between baseline 350 and apex 348 of nano-peak 320. A minimum may be defined for nano-peak height 346 in terms of nanometers. In some embodiments, nano-peak height 346 may be at least 10 (in some embodiments, at least 50, 75, 100, 120, 140, 150, 160, 180, 200, 250, or even at least 500) nanometers.

In some embodiments, nano-peak height 346 is at most 250 (in some embodiments, at most 200) nanometers, particularly for nano-structures 330 on micro-spaces 222. In some embodiments, nano-peak height 346 is in a range from 100 to 250 (in some embodiments, 160 to 200) nanometers. In some embodiments, nano-peak height 346 is 180 nanometers.

In some embodiments, nano-peak height 346 is at most 160 (in some embodiments, at most 140) nanometers, particularly for nano-structures 332 on micro-peaks 220. In some embodiments, nano-peak height 346 is in a range from 75 to 160 (in some embodiments, 100 to 140) nanometers. In some embodiments, nano-peak height 346 is 120 nanometers.

As used herein, the terms "corresponding micro-peak" or "corresponding micro-peaks" refer to micro-peak 220 upon which nano-peak 320 is disposed or, if the nano-peak is disposed on corresponding micro-space 222, refers to one or both of the closest micro-peaks that surround that micro-space. In other words, micro-peaks 220 that correspond to micro-space 222 refer to the micro-peaks in the series of micro-peaks that precede and succeed the micro-space.

Nano-peak height 346 may also be defined relative to micro-peak height 246 of corresponding micro-peak 220. In some embodiments, corresponding micro-peak height 246 may be at least 10 (in some embodiments, at least 50, 100, 150, 200, 300, 400, 500, 600, 700, 800, 900, or even at least 1000) times nano-peak height 346. In some embodiments, corresponding micro-peak height 246 is, at the low end, at least 300 (in some embodiments, at least 400, 500, or even at least 600) times nano-peak height 346. In some embodiments, corresponding micro-peak height 246 is, at the high end, at most 900 (in some embodiments, at most 800, or even at most 700) times nano-peak height 346.

Nano-peak distance 340 may be defined between nano-peaks 320. A maximum for nano-peak distance 340 may be defined. In some embodiments, nano-peak distance 340 may be at most 1000 (in some embodiments, at most 750, 700, 600, 500, 400, 300, 250, 200, 150, or even at most 100) nanometers. In some embodiments, nano-peak distance 340 is at most 400 (in some embodiments, at most 300) nanometers.

A minimum for the nano-peak distance 340 may be defined. In some embodiments, nano-peak distance 340 may be at least 1 (in some embodiments, at least 5, 10, 25, 50, 75, 100, 150, 200, 250, 300, 350, 400, 450, or even at least 500) nanometers. In some embodiments, nano-peak distance 340 is at least 150 (in some embodiments, at least 200) nanometers.

In some embodiments, the nano-peak distance 340 is in a range from 150 to 400 (in some embodiments, 200 to 300) nanometers. In some embodiments, the nano-peak distance 340 is 250 nanometers.

Nano-peak distance 340 may be defined relative to the micro-peak distance 240 between corresponding micro-peaks 220. In some embodiments, corresponding micro-peak distance 240 is at least 10 (in some embodiments, at least 50, 100, 200, 300, 400, 500, 600, 700, 800, 900, or even at least 1000) times nano-peak distance 340. In some embodiments, corresponding micro-peak distance 240 is, at the low end, at least 200 (in some embodiments, at least 300) times nano-peak distance 340. In some embodiments, corresponding micro-peak distance 240 is, at the high end, at most 500 (in some embodiments, at most 400) times the nano-peak distance 340.

In some embodiments of forming antisoiling surface 202 of layer 208, a method may include extruding a hot melt material having a UV-stable material. The extruded material may be shaped with a micro-replication tool. The micro-replication tool may include a mirror image of a series of micro-structures, which may form the series of micro-structures on the surface of the layer 208. The series of micro-structures may include a series of alternating micro-peaks and micro-spaces along an axis. A plurality of nano-structures may be formed on the surface of the layer on at least the micro-spaces. The plurality of nano-peaks may include at least one series of nano-peaks along the axis.

In some embodiments, the plurality nano-structures may be formed by exposing the surface to reactive ion etching. For example, masking elements may be used to define the nano-peaks.

In some embodiments, the plurality of nano-structures may be formed by shaping the extruded material with the micro-replication tool further having an ion-etched diamond. This method may involve providing a diamond tool wherein at least a portion of the tool comprises a plurality of tips, wherein the pitch of the tips may be less than 1 micrometer, and cutting a substrate with the diamond tool, wherein the diamond tool may be moved in and out along a direction at a pitch (p1). The diamond tool may have a maximum cutter width (p2) and $$\frac{p_1}{p_2} \geq 2.$$

The nano-structures may be characterized as being embedded within the micro-structured surface of the layer 208. Except for the portion of the nano-structure exposed to air, the shape of the nano-structure may generally be defined by the adjacent micro-structured material.

A micro-structured surface layer including nano-structures can be formed by use of a multi-tipped diamond tool. Diamond Turning Machines (DTM) can be used to generate micro-replication tools for creating antisoiling surface structures including nano-structures as described in U.S. Pat. Pub. No. 2013/0236697 (Walker et al.) A micro-structured surface further comprising nano-structures can be formed by use of a multi-tipped diamond tool, which may have a single radius, wherein the plurality of tips has a pitch of less than 1 micrometer. Such multi-tipped diamond tool may also be referred to as a "nano-structured diamond tool." Hence, a micro-structured surface wherein the micro-structures further comprise nano-structures can be concurrently formed during diamond tooling fabrication of the micro-structured tool. Focused ion beam milling processes can be used to form the tips and may also be used to form the valley of the diamond tool. For example, focused ion beam milling can be used to ensure that inner surfaces of the tips meet along a common axis to form a bottom of valley. Focused ion beam milling can be used to form features in the valley, such as concave or convex arc ellipses, parabolas, mathematically defined surface patterns, or random or pseudo-random patterns. A wide variety of other shapes of valley could also be formed. Exemplary diamond turning machines and methods for creating discontinuous, or non-uniform, surface structures can include and utilize a fast tool servo (FTS) as described in, for example, PCT Pub. No. WO 00/48037, published Aug. 17, 2000; U.S. Pat. No. 7,350,442 (Ehnes et al.) and U.S. Pat. No. 7,328,638 (Gardiner et al.); and U.S. Pat. Pub. No. 2009/0147361 (Gardiner et al.).

In some embodiments, the plurality of nano-structures may be formed by shaping the extruded material, or layer 208, with the micro-replication tool further having a nano-structured granular plating for embossing. Electrodeposition, or more specifically electrochemical deposition, can also be used to generate various surface structures including nano-structures to form a micro-replication tool. The tool may be made using a 2-part electroplating process, wherein a first electroplating procedure may form a first metal layer with a first major surface, and a second electroplating procedure may form a second metal layer on the first metal layer. The second metal layer may have a second major surface with a smaller average roughness than that of the first major surface. The second major surface can function as the structured surface of the tool. A replica of this surface can then be made in a major surface of an optical film to provide light diffusing properties. One example of an electrochemical deposition technique is described in PCT Pub. No. WO 2018/130926 (Derks et al.).

Figure 4:
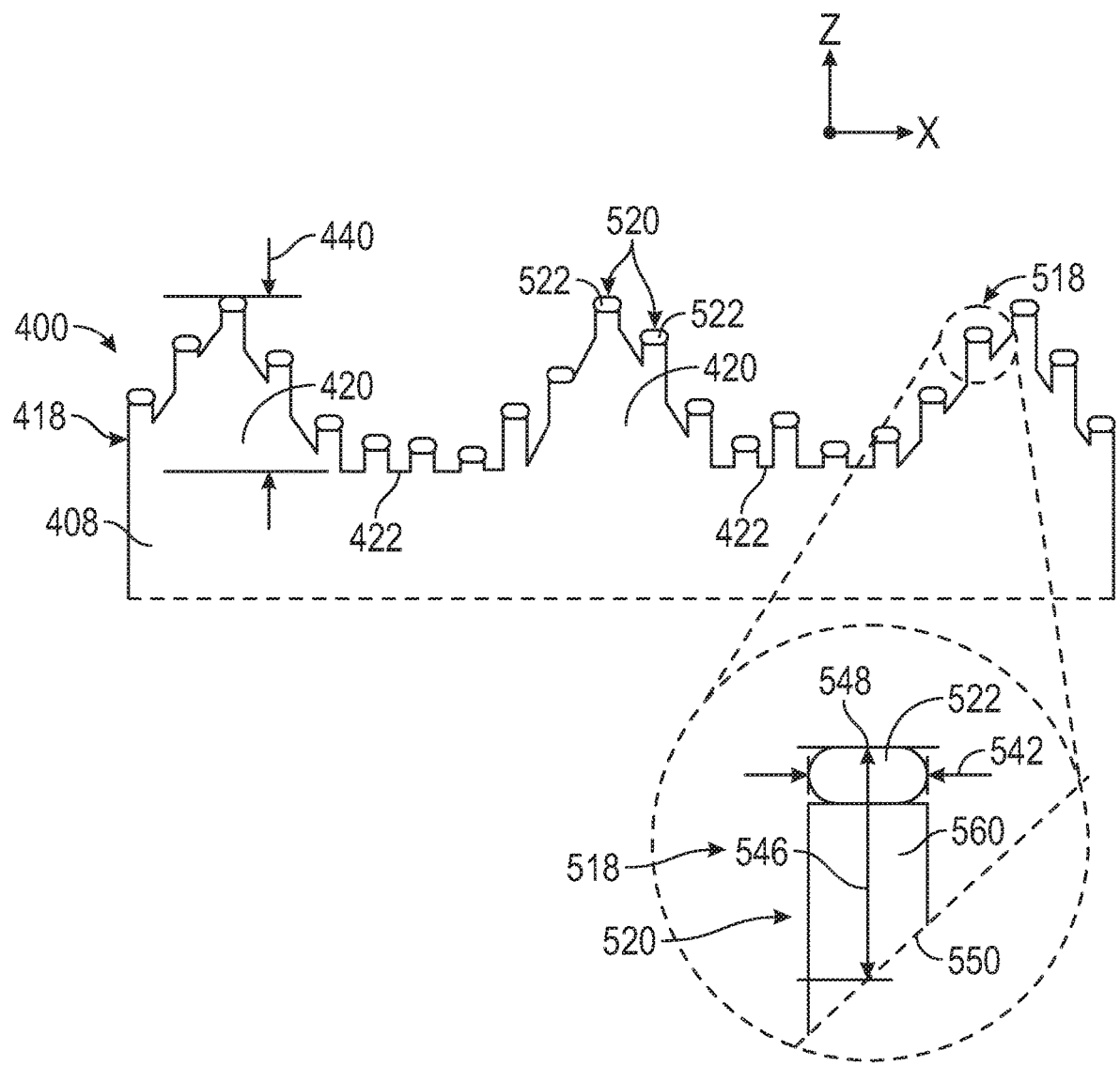
FIG. 4 is a cross-sectional illustration of various nano-structures including masking elements in an xz-plane as an alternative to the nano-structures of FIG. 3 that maybe used with the antisoiling surface structure of FIGS. 2A-2C.

FIG. 4 shows cross section 400 of layer 408 having antisoiling surface 402. Antisoiling surface 402 may be similar to antisoiling surface 202, for example, in that micro-structures 218, 418 of layer 208, 408 may have the same or similar dimensions and may also form a skipped tooth riblet pattern of alternating micro-peaks 420 and micro-spaces 422. Antisoiling surface 402 differs from surface 202 in that, for example, nano-structures 520 may include nano-sized masking elements 522.

Nano-structures 520 may be formed using masking elements 522. For example, masking elements 522 may be used in a subtractive manufacturing process, such as reactive ion etching (RIE), to form nano-structures 520 of surface 402 having micro-structures 418. A method of making a nano-structure and nano-structured articles may involve depositing a layer to a major surface of a substrate, such as layer 408, by plasma chemical vapor deposition from a gaseous mixture while substantially simultaneously etching the surface with a reactive species. The method may include providing a substrate, mixing a first gaseous species capable of depositing a layer onto the substrate when formed into a plasma, with a second gaseous species capable of etching the substrate when formed into a plasma, thereby forming a gaseous mixture. The method may include forming the gaseous mixture into a plasma and exposing a surface of the substrate to the plasma, wherein the surface may be etched, and a layer may be deposited on at least a portion of the etched surface substantially simultaneously, thereby forming the nano-structure.

The substrate can be a (co)polymeric material, an inorganic material, an alloy, a solid solution, or a combination thereof. The deposited layer can include the reaction product of plasma chemical vapor deposition using a reactant gas comprising a compound selected from the group consisting of organosilicon compounds, metal alkyl compounds, metal isopropoxide compounds, metal acetylacetonate compounds, metal halide compounds, and combinations thereof. Nano-structures of high aspect ratio, and optionally with random dimensions in at least one dimension, and even in three orthogonal dimensions, can be prepared.

In some embodiments of a method of forming antisoiling surface 402, layer 408 having a series of micro-structures 418 disposed on surface 402 of the layer may be provided. The series of micro-structures 418 may include a series of alternating micro-peaks 420 and micro-spaces 422.

A series of nano-sized masking elements 522 may be disposed on at least micro-spaces 422. Surface 402 of layer 408 may be exposed to reactive ion etching to form plurality of nano-structures 518 on the surface of the layer including series of nano-peaks 520. Each nano-peak 520 may include masking element 522 and column 560 of layer material between masking element 522 and layer 408.

Masking element 522 may be formed of any suitable material more resistant to the effects of RIE than the material of layer 408. In some embodiments, masking element 522 includes an inorganic material. Non-limiting examples of inorganic materials include silica and silicon dioxide. In some embodiments, the masking element 522 is hydrophilic. Non-limiting examples of hydrophilic materials include silica and silicon dioxide.

As used herein, the term "maximum diameter" refers to a longest dimension based on a straight line passing through an element having any shape.

Masking elements 522 may be nano-sized. Each masking element 522 may define maximum diameter 542. In some embodiments, the maximum diameter of masking element 522 may be at most 1000 (in some embodiments, at most 750, 500, 400, 300, 250, 200, 150, or even at most 100) nanometers.

Maximum diameter 542 of each masking element 522 may be described relative to micro-peak height 440 of corresponding micro-peak 420. In some embodiments, corresponding micro-peak height 440 is at least 10 (in some embodiments, at least 25, 50, 100, 200, 250, 300, 400, 500, 750, or even at least 1000) times maximum diameter 542 of masking element 522.

Each nano-peak 520 may define height 522. Height 522 may be defined between baseline 550 and the apex 548 of masking element 522.

Figure 5A:
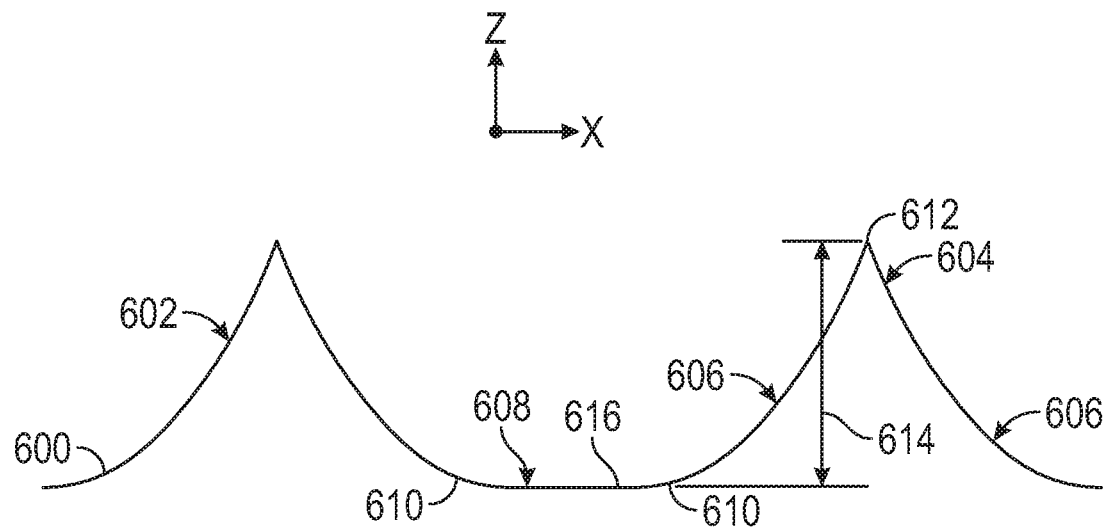
FIGS. 5A and 5B show illustrations of lines representing the cross-sectional profile of different forms of micro-structures for an antisoiling surface structure in an xz-plane.
Figure 5B:
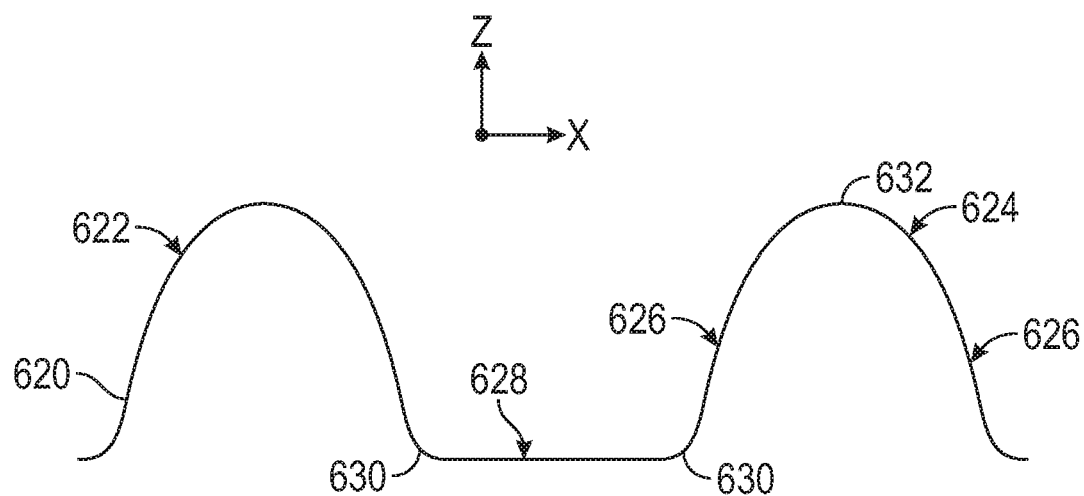

FIGS. 5A and 5B show lines 600 and 620 representing the cross-sectional profile of different forms of peaks 602, 622, which may be micro-peaks of micro-structures or nano-peaks of nano-structures, for any of the antisoiling surfaces, such as surfaces 202, 402. As mentioned, structures do not need to be strictly in the shape of a triangle.

Line 600 shows that first portion 604 (top portion) of peak 602, including apex 612, may have a generally triangular shape, whereas adjacent side portions 606 may be curved. In some embodiments, as illustrated, side portions 606 of peak 602 may not have a sharper turn as it transitions into space 608. Boundary 610 between side portion 606 of peak 602 and space 608 may be defined by a threshold slope of line 600 as discussed herein, for example, with respect to FIGS. 2A-2C and 3.

Space 608 may also be defined in terms of height relative to height 614 of peak 602. Height 614 of peak 602 may be defined between one of boundaries 610 and apex 612. Height of space 608 may be defined between bottom 616, or lowest point of space 608, and one of boundaries 610. In some embodiments, the height of space 608 may be at most 40% (in some embodiments, at most 30%, 25%, 20%, 15%, 10%, 5%, 4%, 3%, or even at most 2%) of height 614 of peak 602. In some embodiments, the height of space 608 is at most 10% (in some embodiments, at most 5%, 4%, 3%, or even at most 2%) of height 614 of peak 602.

Line 620 shows that first portion 624 (top portion) of peak 620, including the apex, may have a generally rounded shape without a sharp turn between adjacent side portions 626. Apex 632 may be defined as the highest point of structure 620, for example, where the slope changes from positive to negative. Although first portion 624 (top portion) may be rounded at apex 632, peak 620 may still define an angle, such as angle A (see FIG. 3), between first and second average slopes.

Boundary 630 between side portion 626 of peak 620 and space 628 may be defined, for example, by a sharper turn. Boundary 630 may also be defined by slope or relative height, as discussed herein.

As shown in FIGS. 6 to 9, the antisoiling surface may be discontinuous, intermittent, or non-uniform. For example, the antisoiling surface may also be described as including micro-pyramids with micro-spaces surrounding the micro-pyramids (see FIGS. 8 and 9).

Figure 6:
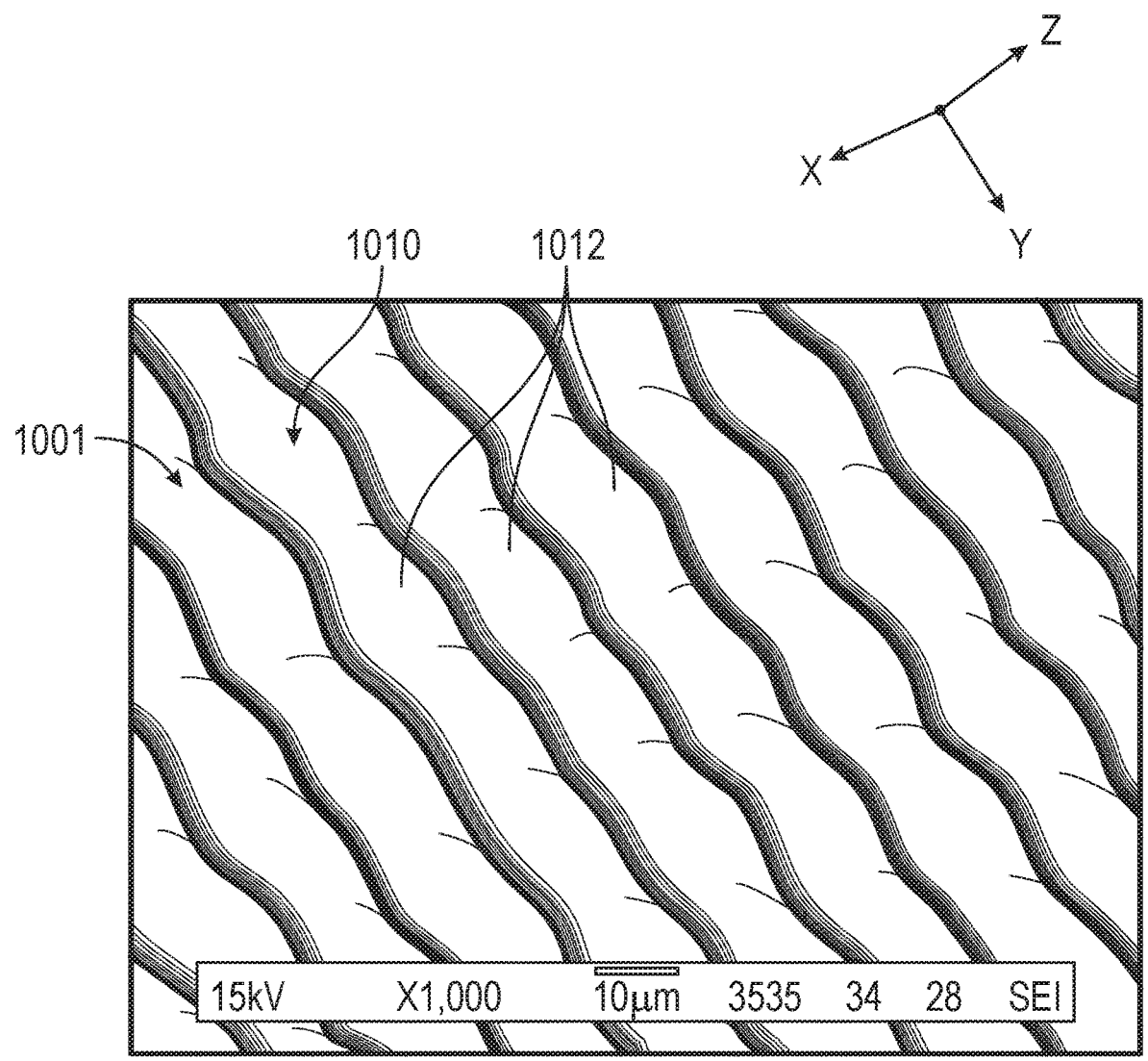
FIG. 6 is a perspective illustration of a portion of a first antisoiling surface structure with discontinuous micro-structures.

FIG. 6 shows first antisoiling surface 1001 defined at least partially by non-uniform micro-structures 1010. For example, if antisoiling surface 1001 were viewed in the yz-plane (similar to FIG. 2B), at least one micro-peak 1012 may have a non-uniform height from the left side to the right side of the view, which can be contrasted to FIG. 2B showing micro-peak 220 having a uniform height from the left side to the right side of the view. In particular, micro-peaks 1012 defined by the micro-structures 1010 may be non-uniform in at least one of height or shape. The micro-peaks 1012 are spaced by micro-spaces (not shown in this perspective view), similar to other surfaces described herein, such as micro-space 222 of surface 202 (FIGS. 2A and 2C).

Figure 7:
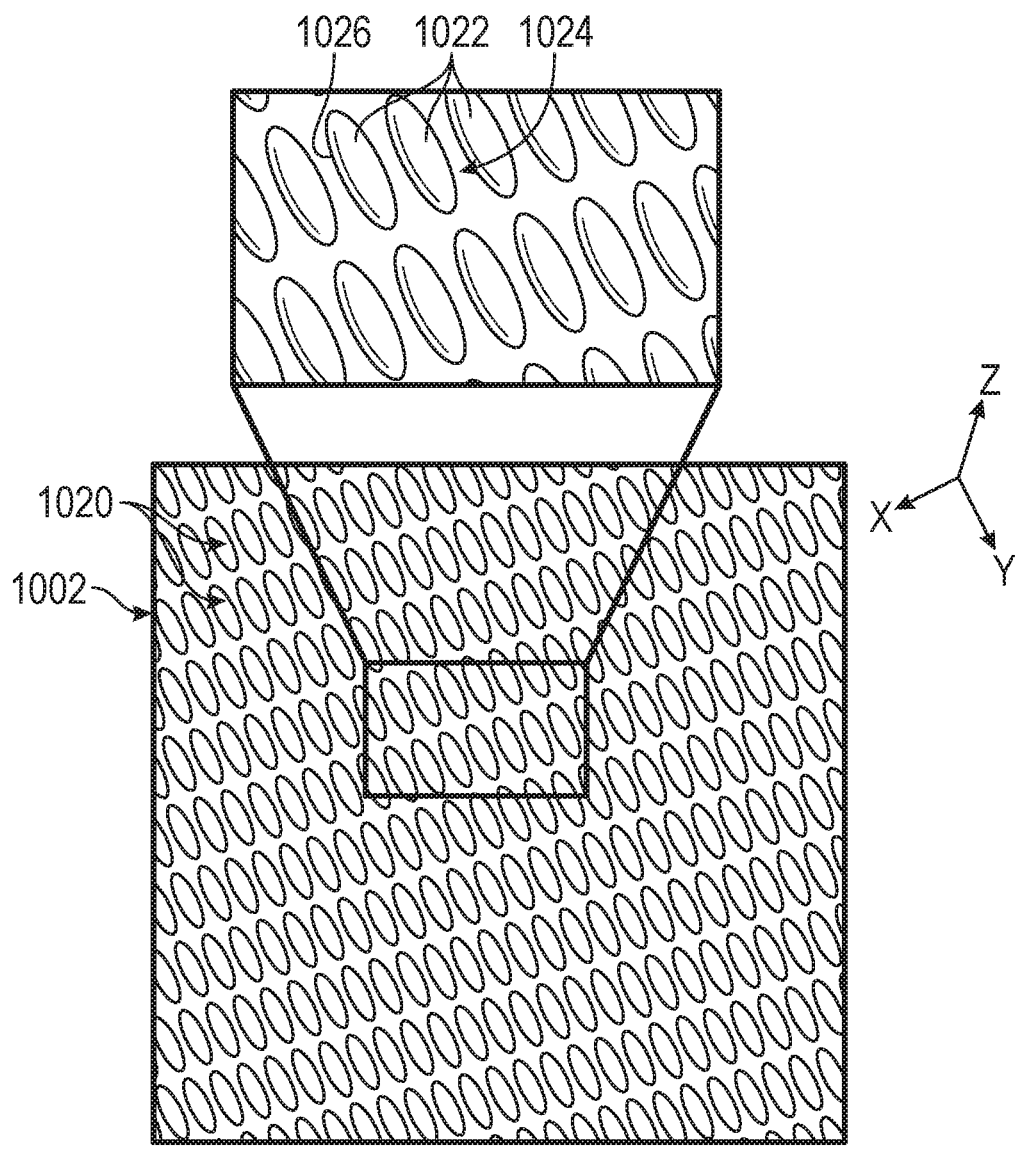
FIG. 7 is a perspective illustration of a portion of a second antisoiling surface structure with discontinuous micro-structures.

FIG. 7 shows second antisoiling surface 1002 with discontinuous micro-structures 1020. For example, if antisoiling surface 1002 were viewed on the yz-plane (similar to FIG. 2B), more than one micro-peak 1022 may be shown spaced by micro-structures 1020, which can be contrasted to FIG. 2B showing micro-peak 220 extending continuously from the left side to the right side of the view. In particular, micro-peaks 1022 of micro-structures 1020 may be surrounded by micro-spaces 1024. Micro-peaks 1022 may each have a half dome-like shape. For example, the half dome-like shape may be a hemisphere, a half ovoid, a half-prolate spheroid, or a half-oblate spheroid. Edge 1026 of the base of each micro-peak 1022, extending around each micro-peak, may be a rounded shape (e.g., a circle, an oval, or a rounded rectangle). The shape of the micro-peaks 1022 may be uniform, as depicted in the illustrated embodiment, or can be non-uniform.

Figure 8:
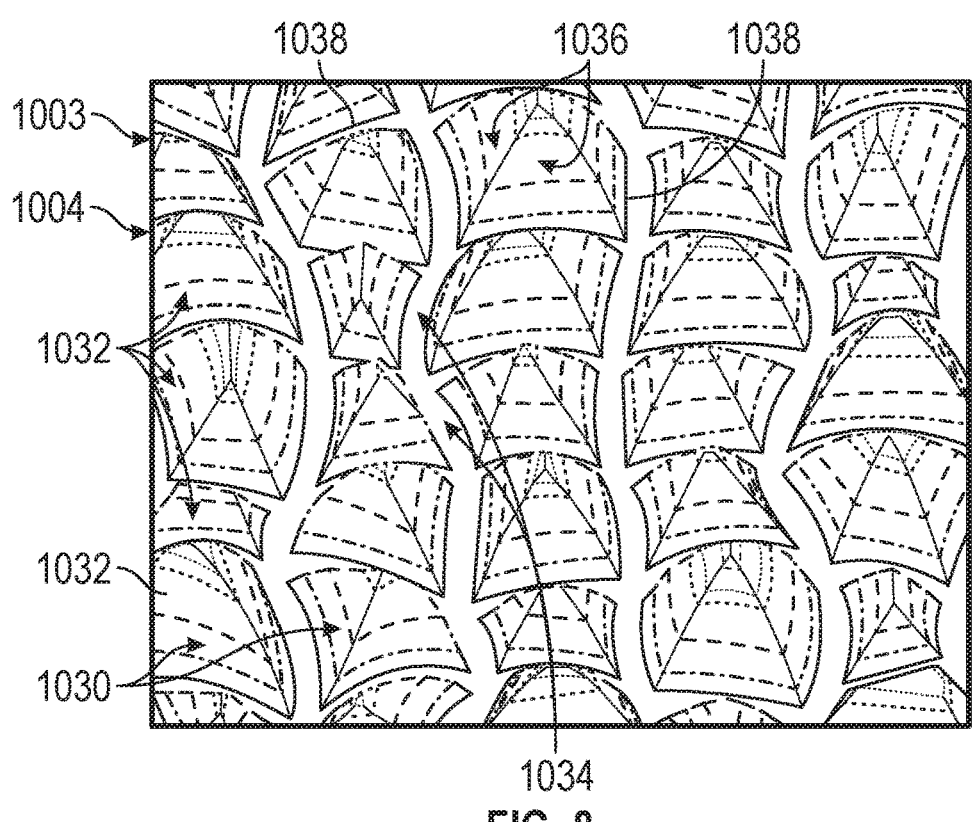
FIGS. 8 and 9 are perspective illustrations of different portions of a third antisoiling surface structure with discontinuous micro-structures.
Figure 8:
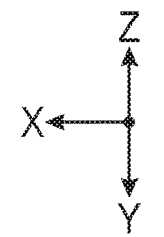
Figure 9:
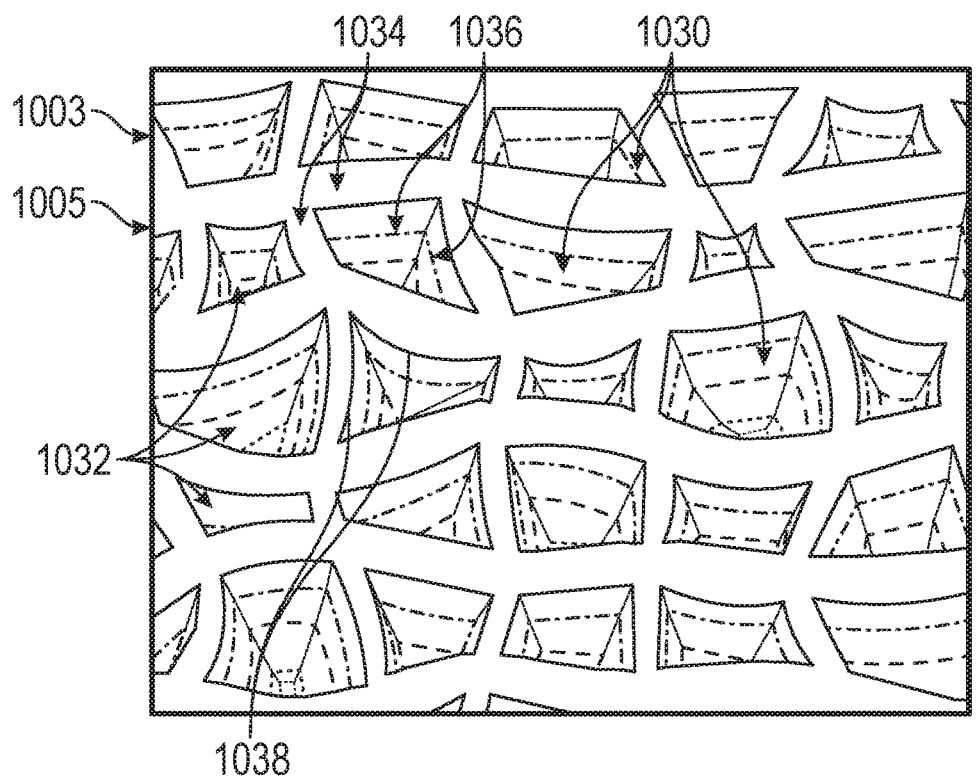
Figure 9:
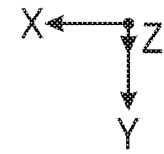

FIGS. 8 and 9 are perspective illustrations of first portion 1004 (FIG. 8) and second portion 1005 (FIG. 9) of third antisoiling surface 1003 with discontinuous micro-structures 1030. Both are perspective views. The FIG. 8 view shows more of a "front" side of the micro-structures 1030 close to a 45-degree angle, whereas the FIG. 9 view shows some of a "back" side of the micro-structures closer to an overhead angle.

Micro-peaks 1032 of micro-structures 1030 surrounded by micro-spaces 1034 may have a pyramid-like shape (e.g., micro-pyramids). For example, the pyramid-like shape may be a rectangular pyramid or a triangular pyramid. Sides 1036 of the pyramid-like shape may be non-uniform in shape or area, as depicted in the illustrated embodiment, or can be uniform in shape or area. Edges 1038 of the pyramid-like shape may be non-linear, as depicted in the illustrated embodiment, or can be linear. The overall volume of each micro-peak 1032 may be non-uniform, as depicted in the illustrated embodiment, or can be uniform.

Multilayer films can be advantageous for having physical and chemical properties on the top surface of the film that differ from the physical and chemical properties on the bottom surface of the film. For example, highly fluorinated polymers are beneficial for stain, chemical, and dirt resistance, but inherently do not adhere well to other polymers or adhesives. A first fluoropolymer layer 1501 having a high content of tetra-fluoroethylene (TFE) have higher fluorine content and thus can be beneficial as the micro-structured surface layer in articles described herein. The second fluoropolymer layer 1502 may have a lower content of TFE and still adhere well to the first fluoropolymer layer 1501. If the second fluoropolymer layer also comprises vinylidene fluoride (VDF), it will adhere well to other fluoropolymers comprising VDF, such as polyvinylidene fluoride (PVDF). If the second, or third, fluoropolymer 1503 layer comprises enough VDF, it will adhere well to non-fluorinated polymer layer 1504 such as acrylate polymers and even urethane polymers. Useful multi-layer fluoropolymer films for antisoiling surface structured films having highly fluorinated top surface layers and less fluorinated bottom surface layers are described in PCT Pub. No. WO2017/172564A2, published 5 Oct. 2017, which is incorporated entirely herein by reference.

In some embodiments, a multi-layer fluoropolymer film can be coextruded and simultaneously extrusion microreplicated with a skipped tooth micro-structure have microspaces. For example, a first fluoropolymer under the trade designation "3M DYNEON THV815" available from 3M Company, can be coextruded as the first layer with a second fluoropolymer under trade designation "3M DYNEON THV221" available from 3M Company as the second layer, and a third fluoropolymer under the trade designation "3M DYNEON PVDF 6008" available from 3M Company as the third layer. Optionally, for example, a fourth layer of a PMMA under the trade designation "V044" available from Arkema, Bristol, PA or of a CoPMMA under the trade designation "KURARITY LA4285" available from Kurary Ltd., Osaka, Japan, or a polymer blend thereof, can be coextruded with the three fluoropolymer layers. This multilayer fluoropolymer coextrusion method may provide a top antisoiling surface structured layer that is highly fluorinated and a bottom layer that has little, or no fluorine content.

UV stabilization with UV-absorbers (UVAs) and Hindered Amine Light Stabilizers (HALs) can intervene in the prevention of photo-oxidation degradation of PETs, PMMAs, and CoPMMAs. UVAs for incorporation into PET, PMMA, or CoPMMA optical layers include benzophenone, benzotriazoles, and benzothiazines Exemplary UVAs for incorporation into PET, PMMA, or CoPMMA optical layers may be provided under the trade designation "TINUVIN 1577" or "TINUVIN 1600," either available from BASF Corporation, Florham Park, NJ Typically, UVAs are incorporated in the polymer at a concentration of 1-10 wt. %. Exemplary HALs for incorporation into PET, PMMA, or CoPMMA optical layers may be provided under the trade designation "CHIMMASORB 944" or "TINUVIN 123," either available from BASF Corporation. Typically, HALs are incorporated into the polymer at a 0.1-1.0 wt. %. A 10:1 ratio of UVA to HALs may be used.

UVAs and HALs can also be incorporated into the fluoropolymer surface layer, or a fluoropolymer layer below the surface layer. U.S. Pat. No. 9,670,300 (Olson et al.) and U.S. Pat. Pub. No. 2017/0198129 (Olson et al.), which are incorporated entirely herein by reference, describe exemplary UVA oligomers compatible with fluoropolymers and fluoropolymer blends.

Other UV blocking additives may be included in the fluoropolymer surface layer. Small particle non-pigmentary zinc oxide and titanium oxide can also be used as UV blocking additives in the fluoropolymer surface layer. Nanoscale particles of zinc oxide and titanium oxide will reflect, or scatter, UV light while being transparent to Visible and near Infrared light. These small zinc oxide and titanium oxide particles in the size range of 10-100 nanometers that can reflect UV light are commercially available from Kobo Products Inc., South Plainfield, NJ.

Anti-stat additives may also be useful for incorporation into either the fluoropolymer surface layer or into the optical layers to reduce unwanted attraction of dust, dirt, and debris. Ionic anti-stats (e.g., under the trade designation "3M IONIC LIQUID ANTI-STAT FC-4400" or "3M IONIC LIQUID ANTI-STAT FC-5000" available from 3M Company) may be incorporated into PVDF fluoropolymer layers to provide static dissipation. Anti-stat additives for PMMA and CoPMMA optical polymer layers may be provided under the trade designation "STATRITE" available from Lubrizol Engineered Polymers, Brecksville, OH. Additional anti-stat additives for PMMA and CoPMMA optical polymer layers may be provided under the trade designation "PELESTAT" available from Sanyo Chemical Industries, Tokyo, Japan. Optionally, anti-stat properties can be provided with transparent conductive coatings, such as: indium tin oxide (ITO), fluorine doped tin oxide (FTO), aluminum doped zinc oxide (AZO), metallic nanowires, carbon nanotubes, or a thin layer of graphene, any of which may be disposed, or coated, onto one of the layers of the antisoiling surface structured films described herein.

Composite cooling films according to the present disclosure preferably have an average absorbance over the wavelength range 8-13 microns of at least 0.85, preferably at least 0.9, and more preferably at least 0.95, although this is not a requirement.

Optional IR-Reflective Layer

The function of the optional IR-reflective layer is to reduce (by reflection) the amount of IR thermal radiation that is generated by the reflective microporous film and transmitted toward any substrate that is intended to be cooled by the composite cooling film.

The optional IR-reflective layer may be composed of any material that has an average reflectance of at least 50 percent over at least the wavelength range of 800 to 1300 nm, and preferably 700 to 2500 nm, and more preferably 700 to 3000 nm.

Figure 10:
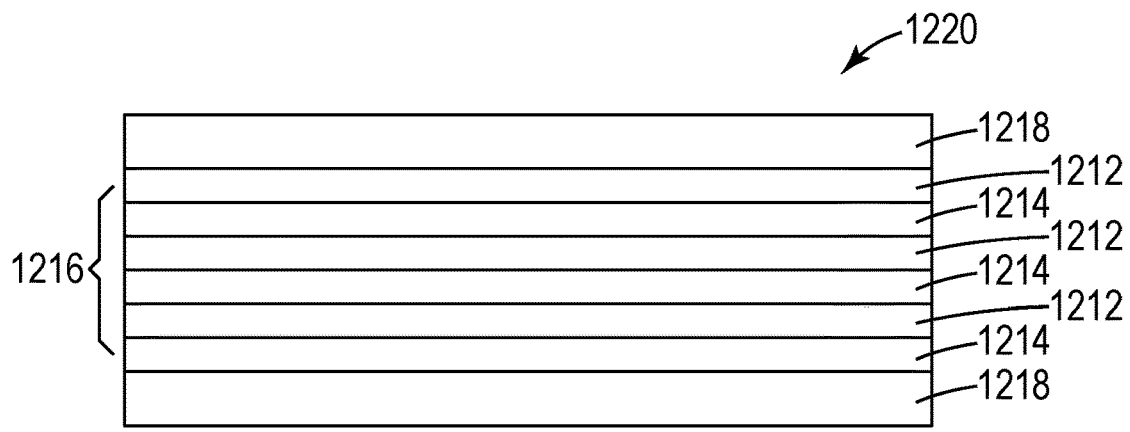
FIG. 10 shows an exemplary IR-reflective multilayer optical film 1220.

FIG. 10 shows an exemplary IR-reflective multilayer optical film 1220, which may also be used as a reflective mirror for visible, and/or infrared wavelengths depending on the configuration of the optical layers. IR-reflective multilayer optical film 1220 includes one or more first optical layers 1212, one or more second optical layers 1214, and optionally one or more IR transparent additional skin layers 1218.

IR-reflective multilayer optical film 1220 includes a multilayer optical stack 1208 having alternating optical layers 1212, 1214 of at least two materials, typically comprising different polymers. An in-plane index of refraction n1 in one in-plane direction of high refractive index layer 1212 is higher than the in-plane index of refraction n2 of low refractive index layer 1214 in the same in-plane direction. The difference in refractive index at each boundary between layers 1212, 1214 causes part of the incident light to be reflected. The transmission and reflection characteristics of IR-reflective multilayer optical film 1220 is based on coherent interference of light caused by the refractive index difference between layers 1212, 1214 and the thicknesses of layers 1212, 1214. When the effective indices of refraction (or in-plane indices of refraction for normal incidence) differ between layers 1212, 1214, the interface between adjacent layers 1212, 1214 forms a reflecting surface. The reflective power of the reflecting surface depends on the square of the difference between the effective indexes of refraction of the layers 1212, 1214 (e.g., $(n1-n2)^2$). By increasing the difference in the indices of refraction between the layers 1212, 1214, improved optical power (higher reflectivity), thinner films (thinner or fewer layers), and broader bandwidth performance can be achieved. The refractive index difference in one in-plane direction in an exemplary embodiment is at least about 0.05, preferably greater than about 0.10, more preferably greater than about 0.15 and even more preferably greater than about 0.20.

In some embodiments, the materials of layers 1212, 1214 inherently have differing indices of refraction. In another embodiment, at least one of the materials of the layers 1212, 1214 has the property of stress induced birefringence, such that the index of refraction (n) of the material is affected by the stretching process. By stretching multilayer film over a range of uniaxial to biaxial orientations, films can be created with a range of reflectivities for differently oriented plane-polarized incident light.

The number of layers in the IR-reflective multilayer optical film 1220 is selected to achieve the desired optical properties using the minimum number of layers for reasons of film thickness, flexibility and economy. In the case of reflective films such as mirrors, the number of layers is preferably less than about 2,000, more preferably less than about 1,000, and even more preferably less than about 750. In some embodiments, the number of layers is at least 150 or 200. In other embodiments, the number of layers is at least 250.

In some embodiments, the IR-reflective multilayer optical film 1220 further comprises optional additional non-optical or optical skin layers. Optional skin layers 1218 may protect the optical layers 1212, 1214 from damage, aid in the co-extrusion processing, and/or enhance post-processing mechanical properties. The additional skin layers 1218 are often thicker than the optical layers 1212, 1214. The thickness of the skin layers 1218 is usually at least two times, preferably at least four times, and more preferably at least ten times, the thickness of the individual optical layers 1212, 1214. The thickness of the skin layers 1218 may be varied to make an IR-reflective multilayer optical film having a particular thickness. A tie layer (not shown) may optionally be present between the skin layer(s) and the optical layers. Further, an optional top coat may be disposed on the skin layer. Typically, one or more of the additional layers 1218 are placed so that at least a portion of the light to be transmitted, polarized, and/or reflected by the optical layers 1212, 1214, also travels through the additional layers (i.e., the additional layers are placed in the path of light which travels through or is reflected by optical layers 1212, 1214). To provide a degree of antisoiling properties, one or both of the skin layers (preferably at least the outermost skin layer) comprises fluoropolymer.

IR-reflective multilayer optical film 1220 comprises multiple low/high index pairs of film layers, wherein each low/high index pair of optical layers 1212, 1214 having a combined optical thickness of ½ the center wavelength of the band it is designed to reflect. Stacks of such films are commonly referred to as quarterwave stacks. In some embodiments, different low/high index pairs of layers may have different combined optical thicknesses, such as where a broadband reflective optical film is desired.

The optical layers may comprise fluorinated polymers (i.e., fluoropolymers), non-fluorinated polymers, and blends thereof.

Examples of fluoropolymers that may be used include copolymers of tetrafluoroethylene (TFE), hexafluoropropylene (HFP), and vinylidene fluoride (e.g., available from 3M Company under the trade designation 3M DYNEON THV); a copolymer of TFE, HFP, vinylidene fluoride, and perfluoropropyl vinyl ether (PPVE) (e.g., available from 3M Company under the trade designation 3M DYNEON THVP); a polyvinylidene fluoride (PVDF) (e.g., 3M DYNEON PVDF 6008 from 3M Company); ethylene chlorotrifluoroethylene polymer (ECTFE) (e.g., available as HALAR 350LC ECTFE from Solvay, Brussels, Belgium); an ethylene tetrafluoroethylene copolymer (ETFE) (e.g., available as 3M DYNEON ETFE 6235 from 3M Company); perfluoroalkoxyalkane polymers (PFA); fluorinated ethylene propylene copolymer (FEP); a polytetrafluoroethylene (PTFE); copolymers of TFE, HFP, and ethylene (HTE) (e.g., available as 3M DYNEON HTE1705 from 3M Company). Combinations of fluoropolymers can also be used. In some embodiments, the fluoropolymer includes FEP. In some embodiments, the fluoropolymer includes PFA.

Examples of non-fluorinated polymers that may be used in at least one layer of IR-reflective multilayer optical film 1320 include at least one of: polyethylene terephthalate, polypropylene, polyethylene, polyethylene copolymers, polymethyl methacrylate, methyl methacrylate copolymers (e.g., copolymers of ethyl acrylate and methyl methacrylate), polyurethanes, extended chain polyethylene polymers (ECPEs), or a combinations thereof. In general, combinations of non-fluorinated polymers can be used. Exemplary non-fluorinated polymers, especially for use in low refractive index optical layers, may include homopolymers of polymethyl methacrylate (PMMA), such as those available as CP71 and CP80 from Ineos Acrylics, Inc., Wilmington, Delaware; and polyethyl methacrylate (PEMA), which has a lower glass transition temperature than PMMA. Additional useful polymers include: copolymers of methyl methacrylate such as, for example, a copolymer made from 75 wt. % methyl methacrylate and 25 wt. % ethyl acrylate, for example, as available from Ineos Acrylics, Inc. as PERSPEX CP63, or as available from Arkema, Philadelphia, Pennsylvania as ALTUGLAS 510, and copolymers of methyl methacrylate monomer units and n-butyl methacrylate monomer units.

Blends of PMMA and PVDF may also be used.

Suitable triblock acrylic copolymers are available, for example, as KURARITY LA4285 from Kuraray America Inc., Houston, Texas Additional suitable polymers for the optical layers, especially for use in the low refractive index optical layers, may include at least one of: polyolefin copolymers such as poly(ethylene-co-octene) (e.g., available as ENGAGE 8200 from Dow Elastomers, Midland, Michigan), polyethylene methacrylate (e.g., available as ELVALOY from Dow Elastomers), poly (propylene-co-ethylene) (e.g., available as Z9470 from Atofina Petrochemicals, Inc., Houston, Texas); and a copolymer of atactic polypropylene and isotactic polypropylene. Materials may be selected based on absorbance or transmittance properties described herein, as well as on refractive index. In general, the greater the refractive index between two materials, the thinner the film can be, which may be desirable for efficient heat transfer.

For IR-reflective multilayer optical films a quarterwave stack design preferably results in each of the layers in the multilayer stack having an average thickness of not more than about 0.7 micrometers, although this is not a requirement.

Multilayer optical films (including reflective polarizers and mirrors) can be made by coextrusion of alternating polymer layers having different refractive indices, for example, as described in U.S. Pat. No. 6,045,894 (Jonza et al.); U.S. Pat. No. 6,368,699 (Gilbert et al.); U.S. Pat. No. 6,531,230 (Weber et al.); U.S. Pat. No. 6,667,095 (Wheatley et al.); U.S. Pat. No. 6,783,349 (Neavin et al.); U.S. Pat. No. 7,271,951 B2 (Weber et al); U.S. Pat. No. 7,632,568 (Padiyath et al.); and U.S. Pat. No. 7,952,805 (McGurran et al.); and PCT Publications WO 95/17303 (Ouderkirk et al.) and WO 99/39224 (Ouderkirk et al.).

Exemplary IR-reflective layers also include: layers of a metal such as, for example, aluminum, gold, or silver; and layers of metal oxide or metal sulfide such as, for example, cerium oxide, aluminum oxide, magnesium oxide, and indium tin oxide.

Other IR-reflective layers known in the art may also be used.

Optional Adhesive Layers

The optional adhesive layers may comprise any adhesive (e.g., thermosetting adhesive, hot melt adhesive, and/or pressure-sensitive adhesive). If present, optional adhesive layer preferably comprises a pressure-sensitive adhesive. In some embodiments, the adhesive may be resistant to ultraviolet radiation damage. Exemplary adhesives which are typically resistant to ultraviolet radiation damage include silicone adhesives and acrylic adhesives containing UV-stabilizing/blocking additive(s), for example, as discussed hereinabove.

The optional adhesive layers may comprise thermally-conductive particles to aid in heat transfer. Exemplary thermally-conductive particles include aluminum oxide particles, alumina nanoparticles, hexagonal boron nitride particles and agglomerates (e.g., available as 3M BORON DINITRIDE from 3M Company), graphene particles, graphene oxide particles, metal particles, and combinations thereof.

Optional releasable liners may comprise, for example, a polyolefin film, a fluoropolymer film, a coated PET film, or a siliconized film or paper.

UV-Stabilizing Additives

UV-stabilizing additives may be added to any component of the composite cooling film (e.g., the UV-reflective multilayer optical film, the optional antisoiling layer, optional adhesive layers, the reflective microporous layer, and/or the IR-reflective layer)

UV stabilization with UV-absorbers (UVAs) and/or Hindered Amine Light Stabilizers (HALS) can intervene in the prevention of photo-oxidation degradation of PET, PMMA, and CoPMMAs. Exemplary UVAs for incorporation into PET, PMMA, or CoPMMA polymer layers include benzophenones, benzotriazoles, and benzotriazines. Commercially available UVAs for incorporation into PET, PMMA, or CoPMMA optical layers include those available as TINUVIN 1577 and TINUVIN 1600 from BASF Corporation, Florham Park, New Jersey Typically, UVAs are incorporated in polymers at a concentration of 1 to 10 weight percent (wt. %).

Exemplary HALS compounds for incorporation into PET, PMMA, or CoPMMA optical layers include those available as CHIMMASORB 944 and TINUVIN 123 from BASF Corporation. Typically, HALS compounds are incorporated into the polymer at a 0.1-1.0 wt. %. A 10:1 ratio of UVA to HALS may be preferred.

UVAs and HALS compounds can also be incorporated into the fluoropolymer layers. U.S. Pat. No. 9,670,300 (Olson et al.) and U.S. Pat. App. Pub. No. 2017/0198129 (Olson et al.) describe exemplary UVA oligomers that are compatible with PVDF fluoropolymers.

Other UV-blocking additives may be included in the fluoropolymer layers. For example, small particle non-pigmentary zinc oxide and titanium oxide can be used. Nanoscale particles of zinc oxide, calcium carbonate, and barium sulfate reflect, or scatter, UV-light while being transparent to visible and near infrared light. Small zinc oxide and barium sulfate particles in the size range of 10-100 nanometers can reflect UV-radiation are available, for example, from Kobo Products Inc., South Plainfield, New Jersey.

Antistatic additives may also be incorporated into any of the polymer films/layers to reduce unwanted attraction of dust, dirt, and debris. Ionic salt antistatic additives available from 3M Company may be incorporated into PVDF fluoropolymer layers to provide static dissipation. Exemplary antistatic additives for PMMA and CoPMMA are commercially available as STAT-RITE from Lubrizol Engineered Polymers, Brecksville, Ohio, or as PELESTAT from Sanyo Chemical Industries, Tokyo, Japan.

Articles and Uses

Composite cooling films according to the present disclosure can be used to cool a substrate with which they are in thermal (e.g., inductive, convective, radiative) communication.

Reflectance in the solar region may be particularly effective in facilitating cooling during the day when subjected to sunlight by reflecting sunlight that would otherwise be absorbed by the object. Absorption in the atmospheric window region may be particularly effective in facilitating cooling at night by radiating or emitting infrared light. Energy may also be radiated or emitted during the day to some degree. In some embodiments, the outer layer of the article will absorb a minimum of solar energy from 0.3 to 2.5 micrometers and absorb a maximum of solar energy from 8 to 14 micrometers.

Figure 11:
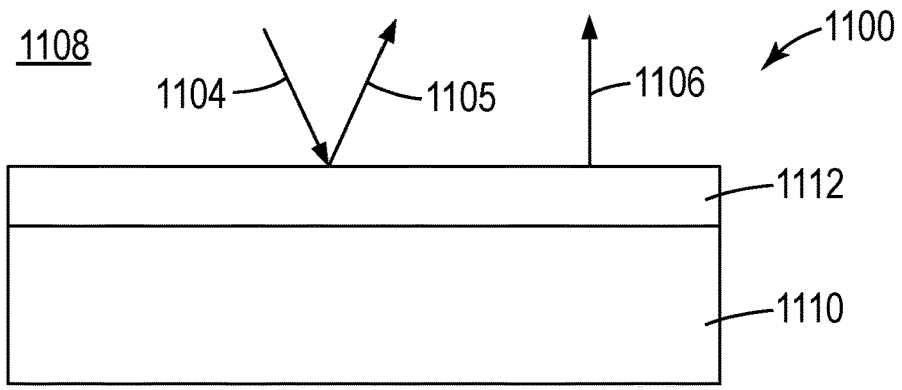
FIG. 11 is a schematic side view of an exemplary article 1100 according to the present disclosure.

Referring now to FIG. 11, article 1100 comprises composite cooling film 1112 applied to (i.e., placed in thermal communication with) substrate 1110. Composite cooling film 1112 may be generally planar in shape; however it does not need to be planar and may be flexible to conform to substrate 1310.

Composite cooling film 1112 may reflect sunlight 1104 to cool substrate 1110, which may be particularly effective in daytime environment. Without composite cooling film 1112, sunlight 1304 may be absorbed by the substrate 1110 and converted into heat. Reflected sunlight 1104 may be directed into atmosphere 1108.

Composite cooling film 1112 may radiate light 1106 in the atmospheric window region of the electromagnetic spectrum into atmosphere 1108 to cool substrate 1110, which may be particularly effective in the nighttime environment. Composite cooling film 1112 may allow heat to be converted into light 1106 (e.g., infrared light) capable of escaping atmosphere 1108 through the atmospheric window. The radiation of light 1106 may be a property of composite cooling film 1112 that does not require additional energy and may be described as passive radiation, which may cool composite cooling film 1112 and substrate 1110 thermally coupled to composite cooling film 1112. During the day, the reflective properties allow composite cooling film 1112 to emit more energy than is absorbed. The radiative properties in combination with the reflective properties, to reflect sunlight during the day, the composite cooling film 1112 may provide more cooling than an article that only radiates energy through the atmosphere and into space.

Exemplary substrates include motor vehicles (e.g., the roof, body panels, and/or windows), buildings (e.g., roofs, walls), heat exchangers, clothing, umbrellas, hats, and railcars. Exemplary substrates may be part of a larger article, apparatus, or system (e.g., a window of building) Among other parameters, the amount of cooling and temperature reduction may depend on the reflective and absorptive properties of composite cooling film 1112. The cooling effect of composite cooling film 1112 may be described with reference to a first temperature of the ambient air proximate or adjacent to the substrate and a second temperature of the portion of substrate 1110 proximate or adjacent to composite cooling film 1312. In some embodiments, the first temperature is greater than the second temperature by at least 2.7 (in some embodiments, at least 5.5, 8.3, or even at least 11.1) degrees Celsius (e.g., at least 5, 10, 15, or even at least 20 degrees Fahrenheit).

Select Embodiments of the Present Disclosure

In a first embodiment, the present disclosure provides a composite cooling film comprising an antisoiling layer secured to a first major surface of a reflective microporous layer, wherein the reflective microporous layer comprises a first fluoropolymer and is diffusely reflective of electromagnetic radiation over a majority of wavelengths in the range of 400 to 2500 nanometers, and wherein the antisoiling layer has an outwardly facing antisoiling surface opposite the reflective microporous layer.

In a second embodiment, the present disclosure provides a composite cooling film according to the first embodiment, further comprising an auxiliary reflective microporous layer secured to the reflective microporous layer opposite the antisoiling layer.

In a third embodiment, the present disclosure provides a composite cooling film according to the first or second embodiment, wherein the auxiliary reflective microporous layer comprises at least one of polyethylene, polypropylene, polysaccharides, or polyethylene terephthalate.

In a fourth embodiment, the present disclosure provides a composite cooling film according to any of the first to third embodiments, wherein the outwardly facing antisoiling surface extends along an axis, wherein a plane containing the axis defines a cross section of the layer and intersects the surface to define a line describing the surface in two dimensions, the layer comprising:
a series of micro-structures at least partially defined by the line, the line defining a series of alternating micro-peaks and micro-spaces along the axis, wherein each micro-space comprises a maximum absolute slope defining an angle from the axis of at most 30 degrees, wherein each micro-peak comprises a first micro-segment defining a first average slope and a second micro-segment defining a second average slope, and wherein an angle formed between the first and second average slopes is at most 120 degrees; and
a plurality of nano-structures at least partially defined by the line, the line defining at least one series of nano-peaks disposed on at least the micro-spaces along the axis,
wherein each nano-peak has a height and each corresponding micro-peak has a height of at least 10 times the height of the nano-peak.

In a fifth embodiment, the present disclosure provides a composite cooling film according to the fourth embodiment, wherein the micro-peak first average slope is positive, and the micro-peak second average slope is negative.

In a sixth embodiment, the present disclosure provides a composite cooling film according to the fourth or fifth embodiment, wherein an absolute value of the micro-peak first average slope is equal to an absolute value of the micro-peak second average slope.

In a seventh embodiment, the present disclosure provides a composite cooling film according to any of the first to third embodiments, wherein the outwardly facing antisoiling surface extends along an axis, wherein a plane containing the axis defines a cross section of the layer and intersects the outwardly facing antisoiling surface to define a line describing the outwardly facing antisoiling surface in two dimensions, the layer comprising:
a series of micro-structures at least partially defined by the line, the line defining a series of alternating micro-peaks and micro-spaces along the axis, wherein a boundary between each adjacent micro-peak and micro-space includes at least one of a bend or an inflection point of the line; and
a plurality of nano-structures at least partially defined by the line, the line defining at least one series of nano-peaks disposed on at least the micro-spaces along the axis,
wherein each nano-peak has a height and each corresponding micro-peak has a height at least 10 times the height of the nano-peak.

In an eighth embodiment, the present disclosure provides a composite cooling film according to any of the fourth to seventh embodiments, wherein a width of each micro-space is at least one of: at least 10% of a corresponding micro-peak distance, or at least 10 micrometers.

In a ninth embodiment, the present disclosure provides a composite cooling film according to any of the fourth to seventh embodiments, wherein a micro-peak distance between micro-peaks is in a range from 1 micrometer to 1000 micrometers.

In a tenth embodiment, the present disclosure provides a composite cooling film according to any of the fourth to ninth embodiments, wherein the micro-peaks have a height of at least 10 micrometers.

In an eleventh embodiment, the present disclosure provides a composite cooling film according to any of the fourth to tenth embodiments, wherein each nano-peak comprises a first nano-segment defining a first average slope and a second nano-segment defining a second average slope, wherein an angle formed between the nano-peak first average slope and the nano-peak second average slope is at most 120 degrees.

In a twelfth embodiment, the present disclosure provides a composite cooling film according to the eleventh embodiment, wherein an absolute value of the nano-peak first average slope is different than an absolute value of the nano-peak second average slope.

In a thirteenth embodiment, the present disclosure provides a composite cooling film according to any of the fourth to twelfth embodiments, wherein the plurality of nano-structures is further disposed on the micro-peaks.

In a fourteenth embodiment, the present disclosure provides a composite cooling film according to any of the fourth to thirteenth embodiments, wherein each nano-peak defines a nano-peak distance and the corresponding micro-peaks define a micro-peak distance of at least 10 times the nano-peak distance.

In a fifteenth embodiment, the present disclosure provides a composite cooling film according to any of the fourth to fourteenth embodiments, wherein a maximum nano-peak distance between nano-peaks is in a range from 1 nanometer to 1 micrometer.

In a sixteenth embodiment, the present disclosure provides a composite cooling film according to any of the fourth to fifteenth embodiments, wherein the nano-peaks comprise at least one masking element.

In a seventeenth embodiment, the present disclosure provides a composite cooling film according to the sixteenth embodiment, wherein the masking element has a diameter of at most 1 micrometer.

In an eighteenth embodiment, the present disclosure provides a composite cooling film according to any of the fourth to seventeenth embodiments, wherein the micro-peaks are non-uniform in at least one of height or shape.

In a nineteenth embodiment, the present disclosure provides a composite cooling film according to any of the first to eighteenth embodiments, wherein the reflective microporous layer comprises a first fluoropolymer and is diffusely reflective of electromagnetic radiation over a majority of wavelengths in the range of 300 to 3000 nanometers.

In a twentieth embodiment, the present disclosure provides a composite cooling film according to any of the first to nineteenth embodiments, wherein the composite cooling film has an average absorbance of electromagnetic radiation of at least 0.9 over the wavelength range of 8-13 microns.

In a twenty-first embodiment, the present disclosure provides a composite cooling film according to any of the first to twentieth embodiments, wherein the outwardly facing outwardly facing antisoiling surface comprises a nano-structured surface superimposed on a micro-structured surface.

In a twenty-second embodiment, the present disclosure provides a composite cooling film according to any of the first to twenty-first embodiments, wherein the nano-structures are at least partially formed by an ion-etching process.

In a twenty-third embodiment, the present disclosure provides a composite cooling film according to any of the first to twenty-second embodiments, wherein the antisoiling layer comprises a second fluoropolymer.

In a twenty-fourth embodiment, the present disclosure provides a composite cooling film according to any of the first to twenty-third embodiments, wherein the reflective microporous layer comprises a micro-voided film.

In a twenty-fifth embodiment, the present disclosure provides a composite cooling film according to any of the first to twenty-fourth embodiments, wherein the micro-voided film comprises a copolymer of monomers comprising tetrafluoroethylene, hexafluoropropylene, and vinylidene fluoride.

In a twenty-sixth embodiment, the present disclosure provides a composite cooling film according to any of the first to twenty-fifth embodiments, wherein the micro-voided polymer film further comprises white inorganic particles.

In a twenty-seventh embodiment, the present disclosure provides a composite cooling film according to any of the first to twenty-sixth embodiments, wherein the micro-voided polymer film further comprises polymer particles.

In a twenty-eighth embodiment, the present disclosure provides a composite cooling film according to any of the first to twenty-seventh embodiments, wherein the polymer particles comprise an aromatic polyester.

In a twenty-ninth embodiment, the present disclosure provides an article comprising a composite cooling film according to any one of the first to twenty-eighth embodiments, further comprising an infrared-reflective layer secured to a second major surface of the micro-voided polymer film opposite the first major surface, wherein the infrared-reflective layer has an average reflectance of at least 0.5 over the wavelength range of 8 to 13 microns.

In a thirtieth embodiment, the present disclosure provides an article comprising a composite cooling film according to any one of the first to twenty-ninth embodiments secured to a substrate.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Example 1

A continuous roll of microporous polyvinylidene fluoride (PVDF) material was prepared using a 40 mm corotating twin screw extruder equipped with a hopper, eight zones with independent temperature controls, and a liquid reservoir for supplying diluent to the extruder. The PVDF polymer pellets obtained as 3M DYNEON PVDF 1012/0001 from 3M Company, St. Paul, Minnesota, and HYPERFORM HPN-68 nucleating agent from Milliken Chemical, Spartanburg, South Carolina, were introduced into the hopper of the 40 mm co-rotating twin-screw extruder. A diluent (triacetin) from Eastman Chemical Company, Kingsport, Tennessee, was injected into the third heated barrel zone of the extruder. The approximate total extrusion rate was 30 pounds per hour (13.6 kilograms per hour) and the screw speed was 150 RPM. The amount of diluent was 59 wt. % of the total weight and the nucleator was 0.35 wt. %. The extruder had eight zones with a temperature profile of zone 1 at 204° C., zone 2 at 260° C., zone 3 at 260° C., zone 4 at 221° C., zone 5 at 204° C., zone 6 at 177° C., zone 7 at 177° C., and zone 8 at 177° C. The melt was subsequently pumped through a double-chromed coat-hanger slot film die, cast onto a chrome roll, at 65.5° C., rotating at 1.98 meters per minute. The cast films were conveyed through a wash tank filled with warm water followed by a drier to substantially remove the diluent and water from the pores.

The microporous PVDF material was sequentially stretch-oriented in a length orienter machine to a stretch ratio of 1.0:1, and then stretched in the cross-direction in a tenter oven equipped with eight temperature zones to a stretch ratio of 1.35:1. The length direction stretch was done at 110° C. The temperatures in the 8 zones of the tenter oven were as follows: zone 1 at 104° C., zone 2 at 121° C., zone 3 at 143° C., zone 4 at 160° C., zone 5 at 160° C., zone 6 at 160° C., zone 7 at 168° C., and zone 8 at 168° C. The resulting oriented reflective microporous fluoropolymer film was 129.5 microns thick, had a density of 0.852 g/cc, a porosity of 52.1%, a Gurley air flow time of 4.2 sec/50 cc, and a bubble point pressure of 33.4 kilopascal using oil as the wetting fluid.

Two layers of the micro-porous PVDF material were then stacked and laminated with OCA 8171 optically clear adhesive from 3M Company, St. Paul, Minnesota, to an aluminum plate having a J-type thermocouple embedded in its surface and adhered with 3M 425 HD 6127-41 aluminum-backed tape from 3M Company to create radiative cooling plate RCP1. One-inch thick Styrofoam insulation was placed under the aluminum radiative cooling plate RCP1 to thermally isolate it from the ground. Another bare aluminum plate with J-type thermocouple embedded in its surface and adhered with 3M 425 HD 6127-41 aluminum-backed tape was used as the control radiative cooling plate. One-inch thick Styrofoam insulation was also placed under the aluminum control radiative cooling plate to thermally isolate it from the ground. With an ambient air temperature of 18° C., the two radiative cooling plates were placed under the sun at noon. After 1 hr of temperature equilibration, the temperature of the control radiative cooling plate was measured to be 25.6° C. and the temperature of radiative cooling plate 1 was measured to be 17.2° C., or 0.8° C. below ambient temperature.

Example 2

A nano-structured anti-soiling fluoropolymer film was laminated to the top surface of the reflective microporous fluoropolymer film described in Example 1. The surface structured anti-soiling film was made by extruding a Kynar 710 PVDF fluoropolymer from Arkema, Inc., King of Prussia, Pennsylvania against a nano-micro-replication casting tool to create the surface structure shown in FIG. 3. The PVDF was extruded at a rate of 90.9 kg per hour and a temperature of 204° C. at a line speed of 0.44 meters per second. The anti-soiling surfaced microporous fluoropolymer film was then laminated to an aluminum plate having a J-type thermocouple embedded in its surface and adhered with 3M 425 HD 6127-41 aluminum-backed tape to create radiative cooling plate RCP2. One-inch thick Styrofoam insulation was placed under the aluminum radiative cooling plate RCP2 to thermally isolate it from the ground. Another bare aluminum plate with J-type thermocouple embedded in its surface and adhered with 3M 425 HD 6127-41 aluminum-backed tape was used as the control radiative cooling plate. One-inch thick Styrofoam insulation was also placed under the aluminum control radiative cooling plate to thermally isolate it from the ground. With an ambient air temperature of 21.4° C., the two radiative cooling plates were placed under the sun at noon. After 1 hr of temperature equilibration, the temperature of the control radiative cooling plate was measured to be 37.7° C. and the temperature of radiative cooling plate 2 was measured to be 20° C., or 1.4° C. below ambient temperature.

Example 3

A continuous roll of microporous ethylene-chlorotrifluoroethylene fluoropolymer "ECTFE" material was prepared using a 40 mm twin screw extruder equipped with a hopper, eight zones with independent temperature controls and a liquid reservoir for supplying diluent to the extruder. ECTFE fluoropolymer obtained as HALAR 901 DA from Solvay, Solexis, New Jersey, copolymer pellets and ethylene-trifluoroethylene fluoropolymer (ETFE) nucleating agent obtained as 3M DYNEON ETFE 6235 from 3M Company were introduced into the hopper using a solids feeder, and the materials were fed into the extruder, which was maintained at a screw speed of 230 rpm. Dibutyl sebacate (DBS) diluent from Vertellus Performance Materials, Greensboro, North Carolina, was fed separately from the reservoir into the extruder. The weight ratio of ECTFE copolymer/diluent/nucleating agent was 64.5/35/0.5. The total extrusion rate was 18.14 kg/hr and the extruder's eight zones were set to provide a temperature profile for zones 1 to 8 of 204° C., 254° C., 254° C., 260° C., 260° C., 254° C., 249° C., and 249° C., respectively. The melt composition was uniformly mixed and subsequently pumped through a double-chromed coat-hanger slot film die maintained at 224° C., and cast onto a patterned casting wheel maintained at a wheel temperature of 60° C., with a gap between the film die and the casting wheel of 2.5 cm. The casting speed was 4.57 m/min and the film was washed in-line in a continuous manner to remove the DBS in a mixed solvent (obtained as 3M NOVEC 71DE Engineered Fluid from 3M Company, St. Paul, Minnesota) and air dried.

The microporous ECTFE material was sequentially stretch-oriented in a length orienter machine to a stretch ratio of 2.4:1, and then stretched in the cross-direction in a tenter oven equipped with eight temperature zones to a stretch ratio of 2.6:1. The length direction stretch was made at 126° C. The temperatures in the 8 zones of the tenter oven were as follows: zone 1 132° C., zone 2 138° C., zone 3 149° C., zone 4 154° C., zone 5 160° C., zone 6 160° C., zone 7 160° C., zone 8 149° C. The resulting oriented reflective microporous film was 47 microns thick, a density of 0.50 g/cc, a porosity of 70.5%, a Gurley air flow time of 7.5 sec/50 cc, and a bubble point pressure of 121.6 kilopascal using isopropyl alcohol.

Five layers of the micro-porous fluoropolymer ECTFE material were then stacked and laminated with OCA 8171 optically clear adhesive to an aluminum plate having a J-type thermocouple embedded in its surface and adhered with 3M 425 HD 6127-41 aluminum-backed tape to create radiative cooling plate RCP3. One-inch thick Styrofoam insulation was placed under the aluminum control radiative cooling plate RCP3 to thermally isolate it from the ground. Another bare aluminum plate with J-type thermocouple embedded in its surface and adhered with 3M 425 HD 6127-41 aluminum-backed tape was used as the control radiative cooling plate. One-inch thick Styrofoam insulation was also placed under the aluminum control radiative cooling plate to thermally isolate it from the ground. With an ambient air temperature of 17.8° C., the two radiative cooling plates were placed under the sun at noon. After 1 hr of temperature equilibration, the temperature of the control radiative cooling plate was measured to be 25.6° C. and the temperature of radiative cooling plate RCP3 was measured to be 15.4° C., or 2.4° C. below ambient temperature.

Example 4

A nano-structured anti-soiling fluoropolymer film was laminated to the top surface of the microporous fluoropolymer film described in Example 3. The surface structured anti-soiling film was made by extruding a Kynar 710 PVDF fluoropolymer against a nano-micro-replication casting tool to create the surface structure shown in FIG. 3. The PVDF was extruded at a rate of 90.9 kg per hour and a temperature of 204° C. at a line speed of 0.44 meters per second. The anti-soiling surfaced microporous fluoropolymer film was then laminated to an aluminum plate having a J-type thermocouple embedded in its surface and adhered with 3M 425 HD 6127-41 aluminum-backed tape to create radiative cooling plate RCP4. One-inch thick Styrofoam insulation was placed under the aluminum control radiative cooling plate RCP4 to thermally isolate it from the ground. Another bare aluminum plate with J-type thermocouple embedded in its surface and adhered with 3M 425 HD 6127-41 aluminum-backed tape was used as the control radiative cooling plate. One-inch thick Styrofoam insulation was also placed under the aluminum control radiative cooling plate to thermally isolate it from the ground. With an ambient air temperature of 21.4° C., the two radiative cooling plates were placed under the sun at noon. After 1 hr of temperature equilibration, the temperature of the control radiative cooling plate was measured to be 37.7° C. and the radiative cooling plate RCP4 temperature was measured to be 20.3° C., or 1.1° C. below ambient temperature.

Example 5

A PTFE membrane having a thickness of 11 microns (obtained as TEFLON PFS 020 10 from W. L. Gore & Associates, Inc., Elkton, MD) was used. Eight layers of the micro-porous PTFE material were stacked and laminated with OCA 8171 optically clear adhesive to an aluminum plate having a J-type thermocouple embedded in its surface and adhered with 3M 425 HD 6127-41 aluminum-backed tape to create radiative cooling plate RCP5. One-inch thick Styrofoam insulation was placed under the aluminum radiative cooling plate RCP5 to thermally isolate it from the ground. Another bare aluminum plate with J-type thermocouple embedded in its surface and adhered with 3M 425 HD 6127-41 aluminum-backed tape was used as the control radiative cooling plate. One-inch thick Styrofoam insulation was also placed under the aluminum control radiative cooling plate to thermally isolate it from the ground. With an ambient air temperature of 17.8° C., the two radiative cooling plates were placed under the sun at noon. After 1 hr of temperature equilibration, the temperature of the control radiative cooling plate was measured to be 25.6° C. and the temperature of radiative cooling plate RCP5 was measured to be 16.7° C., or 2.1° C. below ambient temperature.

Example 6

A nano-structured anti-soiling fluoropolymer film was laminated to the top surface of the microporous fluoropolymer film described in Example 5. The surface structured anti-soiling film was made by extruding KYNAR 710 PVDF fluoropolymer against a nano-micro-replication casting tool to create the surface structure shown in FIG. 3. The PVDF was extruded at a rate of 90.9 kg per hour and a temperature of 204° C. at a line speed of 0.44 meters per second. The anti-soiling surfaced microporous fluoropolymer film was then laminated to an aluminum plate having a J-type thermocouple embedded in its surface and adhered with 3M 425 HD 6127-41 aluminum-backed tape to create radiative cooling plate RCP6. One-inch thick Styrofoam insulation was placed under the aluminum radiative cooling plate RCP6 to thermally isolate it from the ground. Another bare aluminum plate with J-type thermocouple embedded in its surface and adhered with 3M 425 HD 6127-41 aluminum-backed tape was used as the control radiative cooling plate. One-inch thick Styrofoam insulation was also placed under the aluminum control radiative cooling plate to thermally isolate it from the ground. With an ambient air temperature of 21.7° C., the two radiative cooling plates were placed under the sun at noon. After 1 hr of temperature equilibration, the temperature of the control radiative cooling plate was measured to be 37.7° C. and the temperature of radiative cooling plate RCP6 was measured to be 20.6° C., or 1.1° C. below ambient temperature.

Example 7

A nano-structured anti-soiling fluoropolymer film was laminated to the top surface of the microporous fluoropolymer film described in Example 3. The surface structured anti-soiling film was made by extruding a Kynar 710 PVDF fluoropolymer against a nano-micro-replication casting tool to create the surface structure shown in FIG. 3. The PVDF was extruded at a rate of 90.9 kg per hour and a temperature of 204° C. at a line speed of 0.44 meters per second. The anti-soiling surfaced microporous fluoropolymer film was then laminated to a 188 microns thick micro-voided PET film obtained as LUMIRROR XJSA2 from Toray Plastics (America) Inc., North Kingstown, Rhode Island using an optically clear adhesive obtained as OCA 8171 from 3M Company as shown in FIG. 12.

The anti-soiling surfaced microporous composite film was then laminated with optically clear adhesive obtained as OCA8171 from 3M Company to an aluminum plate having a J-type thermocouple embedded in its surface and adhered with 3M 425 HD 6127-41 aluminum-backed tape to create radiative cooling plate RCP4. One-inch thick Styrofoam insulation was placed under the aluminum control radiative cooling plate RCP7 to thermally isolate it from the ground. Another bare aluminum plate with J-type thermocouple embedded in its surface and adhered with 3M 425 HD 6127-41 aluminum-backed tape was used as the control radiative cooling plate. One-inch thick Styrofoam insulation was also placed under the aluminum control radiative cooling plate to thermally isolate it from the ground. With an ambient air temperature of 19.8° C., the two radiative cooling plates were placed under the sun at noon. After 1 hr of temperature equilibration, the temperature of the control radiative cooling plate was measured to be 31.7° C. and the radiative cooling plate RCP7 temperature was measured to be 16.6° C., or 3.2° C. below ambient temperature.

All cited references, patents, and patent applications in this application that are incorporated by reference, are incorporated in a consistent manner. In the event of inconsistencies or contradictions between portions of the incorporated references and this application, the information in this application shall control. The preceding description, given in order to enable one of ordinary skill in the art to practice the claimed disclosure, is not to be construed as limiting the scope of the disclosure, which is defined by the claims and all equivalents thereto.

What is claimed is:

1. A composite cooling film comprising an antisoiling layer secured to a first major surface of a reflective microporous layer, wherein the reflective microporous layer comprises a first fluoropolymer and is diffusely reflective of electromagnetic radiation over a majority of wavelengths in the range of 400 to 2500 nanometers, and wherein the antisoiling layer has an outwardly facing antisoiling surface opposite the reflective microporous layer, wherein the outwardly facing antisoiling surface extends along an axis, wherein a plane containing the axis defines a cross section of the layer and intersects the surface to define a line describing the surface in two dimensions, the layer comprising:

a series of micro-structures at least partially defined by the line, the line defining a series of alternating micro-peaks and micro-spaces along the axis, wherein each micro-space comprises a maximum absolute slope defining an angle from the axis of at most 30 degrees, wherein each micro-peak comprises a first micro-segment defining a first average slope and a second micro-segment defining a second average slope, and wherein an angle formed between the first and second average slopes is at most 120 degrees; and a plurality of nano-structures at least partially defined by the line, the line defining at least one series of nano-peaks disposed on at least the micro-spaces along the axis, wherein each nano-peak has a height and each corresponding micro-peak has a height of at least 10 times the height of the nano-peak.

2. The composite cooling film of claim 1, further comprising an auxiliary reflective microporous layer secured to the reflective microporous layer opposite the antisoiling layer.

3. The composite cooling film of claim 2, wherein the auxiliary reflective microporous layer comprises at least one of polyethylene, polypropylene, polysaccharides, or polyethylene terephthalate.

4. The composite cooling film of claim 1, wherein the micro-peak first average slope is positive, and the micro-peak second average slope is negative.

5. The composite cooling film of claim 1, wherein an absolute value of the micro-peak first average slope is equal to an absolute value of the micro-peak second average slope.

6. The composite cooling film of claim 1,
wherein a boundary between each adjacent micro-peak and micro-space includes at least one of a bend or an inflection point of the line.

7. The composite cooling film of claim 1, wherein a width of each micro-space is at least one of: at least 10% of a corresponding micro-peak distance, or at least 10 micrometers.

8. The composite cooling film of claim 1, wherein a micro-peak distance between micro-peaks is in a range from 1 micrometer to 1000 micrometers.

9. The composite cooling film of claim 1, wherein the micro-peaks have a height of at least 10 micrometers.

10. The composite cooling film of claim 1, wherein each nano-peak comprises a first nano-segment defining a first average slope and a second nano-segment defining a second average slope, wherein an angle formed between the nano-peak first average slope and the nano-peak second average slope is at most 120 degrees.

11. The composite cooling film of claim 10, wherein an absolute value of the nano-peak first average slope is different than an absolute value of the nano-peak second average slope.

12. The composite cooling film of claim 1, wherein the plurality of nano-structures is further disposed on the micro-peaks.

13. The composite cooling film of claim 1, wherein each nano-peak defines a nano-peak distance and the corresponding micro-peaks define a micro-peak distance of at least 10 times the nano-peak distance.

14. The composite cooling film of claim 1, wherein a maximum nano-peak distance between nano-peaks is in a range from 1 nanometer to 1 micrometer.

15. The composite cooling film of claim 1, wherein the nano-peaks comprise at least one masking element.

16. The composite cooling film of claim 15, wherein the masking element has a diameter of at most 1 micrometer.

17. The composite cooling film of claim 1, wherein the micro-peaks are non-uniform in at least one of height or shape.

18. The composite cooling film of claim 1, wherein the composite cooling film has an average absorbance of electromagnetic radiation of at least 0.9 over the wavelength range of 8-13 microns.

19. The composite cooling film of claim 1, wherein the outwardly facing outwardly facing antisoiling surface comprises a nano-structured surface superimposed on a micro-structured surface.

20. The composite cooling film of claim 19, wherein the nano-structures are at least partially formed by an ion-etching process.

21. The composite cooling film of claim 1, wherein the antisoiling layer comprises a second fluoropolymer.

22. The composite cooling film of claim 1, wherein the reflective microporous layer comprises a micro-voided film.

23. The composite cooling film of claim 22, wherein the micro-voided film comprises a copolymer of monomers comprising tetrafluoroethylene, hexafluoropropylene, and vinylidene fluoride.

24. The composite cooling film of claim 22, wherein the micro-voided polymer film further comprises white inorganic particles.

25. The composite cooling film of claim 22, wherein the micro-voided polymer film further comprises polymer particles.

26. The composite cooling film of claim 25, wherein the polymer particles comprise an aromatic polyester.

27. The composite cooling film of claim 22, further comprising an infrared-reflective layer secured to a second major surface of the micro-voided polymer film opposite the first major surface, wherein the infrared-reflective layer has an average reflectance of at least 0.5 over the wavelength range of 8 to 13 microns.

28. An article comprising the composite cooling film of claim 1 secured to a substrate, wherein the antisoiling layer is further from the substrate than the reflective microporous layer.

29. A method of passive cooling a substrate, the method comprising:
providing the composite cooling film according to claim 1 on a substrate; and
reflecting sunlight with the composite cooling film.

* * * * *